(12) United States Patent
Wang et al.

(10) Patent No.: US 11,508,059 B2
(45) Date of Patent: Nov. 22, 2022

(54) METHODS AND SYSTEMS FOR DETECTING A CENTERLINE OF A VESSEL

(71) Applicant: SHANGHAI UNITED IMAGING HEALTHCARE CO., LTD., Shanghai (CN)

(72) Inventors: Xiaodong Wang, Shanghai (CN); Yufei Mao, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 1094 days.

(21) Appl. No.: 15/638,423

(22) Filed: Jun. 30, 2017

(65) Prior Publication Data
US 2018/0005372 A1 Jan. 4, 2018

Related U.S. Application Data

(63) Continuation of application No. PCT/CN2016/097294, filed on Aug. 30, 2016.

(30) Foreign Application Priority Data

Jun. 30, 2016 (CN) .......................... 201610503509.7

(51) Int. Cl.
*G06T 7/11* (2017.01)
*G06T 7/00* (2017.01)
(Continued)

(52) U.S. Cl.
CPC .............. *G06T 7/0012* (2013.01); *G06T 7/11* (2017.01); *G06T 7/136* (2017.01); *G06T 7/66* (2017.01);
(Continued)

(58) Field of Classification Search
None
See application file for complete search history.

(56) References Cited

U.S. PATENT DOCUMENTS 6,381,350 B1 4/2002 Klingensmith et al.
2007/0296824 A1* 12/2007 Paine .................... G06T 15/205
348/222.1
(Continued)

FOREIGN PATENT DOCUMENTS

CN 101393644 A 3/2009
CN 101425186 A 5/2009
(Continued)

OTHER PUBLICATIONS

International Search Report in PCT/CN2016/097294 dated Mar. 1, 2017, 7 pages.
(Continued)

*Primary Examiner* — Patricia J Park
(74) *Attorney, Agent, or Firm* — Metis IP LLC

(57) ABSTRACT

This application discloses a method and system for detecting a centerline of a vessel. The method may include obtaining image data, wherein the image data may include vessel data; selecting two endpoints of the vessel based on the vessel data; transforming the image data to generate a transformed image based on at least one image transformation function; and determining a path of the centerline of the vessel connecting the first endpoint of the vessel and the second endpoint of the vessel to obtain the centerline of the vessel based on the transformed image. The two endpoints of the vessel may include a first endpoint of the vessel and a second endpoint of the vessel.

19 Claims, 12 Drawing Sheets

(51) Int. Cl.
  *G06T 7/136* (2017.01)
  *G06V 10/26* (2022.01)
  *G06V 10/34* (2022.01)
  *G06T 7/66* (2017.01)
  *G06K 9/62* (2022.01)

(52) U.S. Cl.
  CPC .............. *G06V 10/26* (2022.01); *G06V 10/34* (2022.01); *G06K 9/6201* (2013.01); *G06T 2207/20041* (2013.01); *G06T 2207/20156* (2013.01); *G06T 2207/20161* (2013.01); *G06T 2207/30101* (2013.01); *G06T 2207/30172* (2013.01); *G06V 2201/03* (2022.01)

(56) References Cited

U.S. PATENT DOCUMENTS

| | | | |
|---|---|---|---|
| 2010/0061601 A1* | 3/2010 | Abramoff | G06T 7/33 382/117 |
| 2010/0159497 A1* | 6/2010 | Kimia | G06T 7/44 435/29 |
| 2010/0296709 A1* | 11/2010 | Ostrovsky-Berman | G06T 7/11 382/128 |
| 2012/0078099 A1* | 3/2012 | Suri | A61B 8/0891 600/440 |
| 2012/0203530 A1* | 8/2012 | Sharma | G16H 50/50 703/9 |
| 2014/0355858 A1* | 12/2014 | O'Dell | G06T 7/11 382/131 |

FOREIGN PATENT DOCUMENTS

| | | |
|---|---|---|
| CN | 101923713 A | 12/2010 |
| CN | 102622587 A | 8/2012 |
| CN | 102722882 A | 10/2012 |
| CN | 102800089 A | 11/2012 |
| CN | 103810363 A | 5/2014 |
| CN | 103942772 A | 7/2014 |
| CN | 105427277 A | 3/2016 |
| EP | 2300990 B1 | 5/2014 |

OTHER PUBLICATIONS

Thomas Deschamps and Laurent D.Cohen, "Fast extraction of minimal paths in 3D images and applications to virtual endoscopy". Medical Image Analysis 5(2001): 281-299.

M. Sabry Hassouna and Aly A. Farag, "Robust Centerline Extraction Framework Using Level Sets", IEEE Computer Society Conference on Computer Vision and Pattern Recognition, 2005.

Rui Wang et al., "Threshold segmentation algorithm for automatic extraction of cerebral vessels from barin magnetic resonance angiography images", Journal of Neuroscience Methods 241(2015) 30-36.

Nana Dong,"The Research of Algorithm for Blood Vessels and the Centerline of Vessels Extraction", 2013.

Xiaofang Zhao, "Research on Some Key Problems in Processing of Retinal Vessel Images", 2011.

First Office Action in Chinese Application No. 201610503509.7 dated Apr. 26, 2018, 19 pages.

* cited by examiner

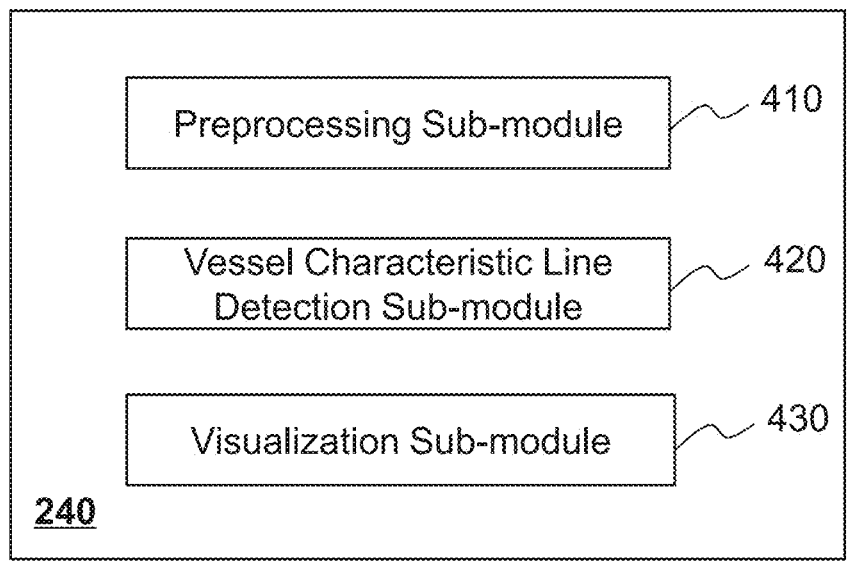
FIG. 4-A
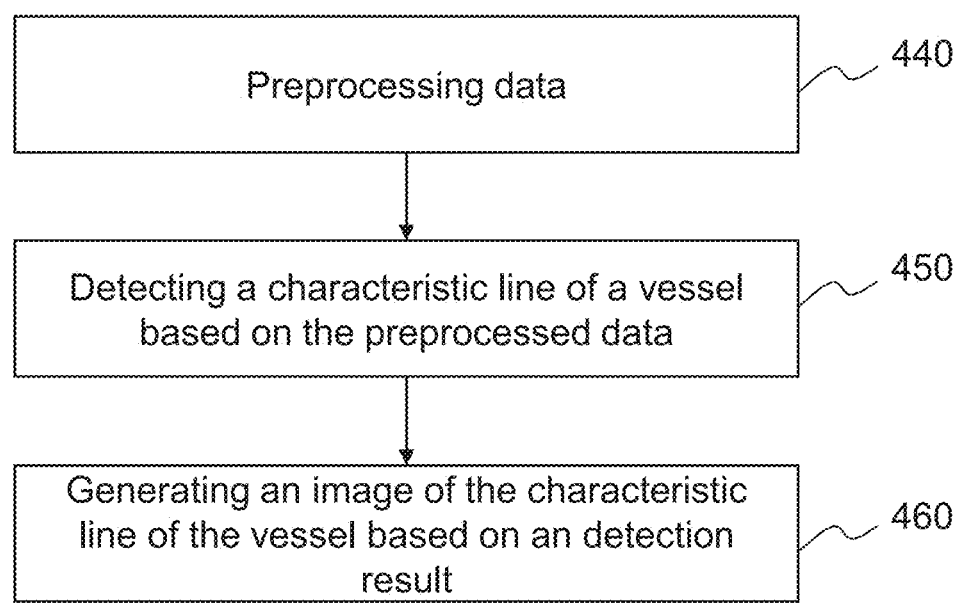
FIG. 4-B

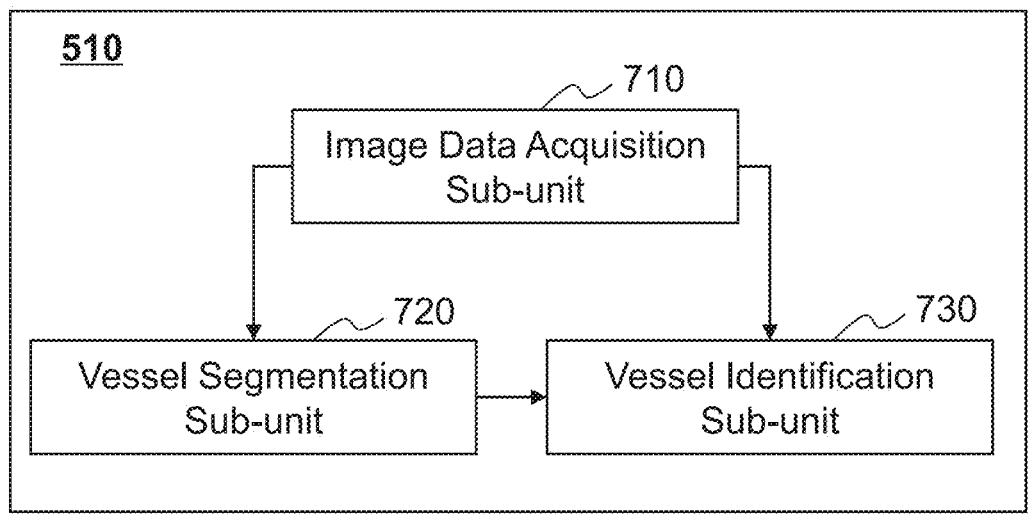
FIG. 7-A
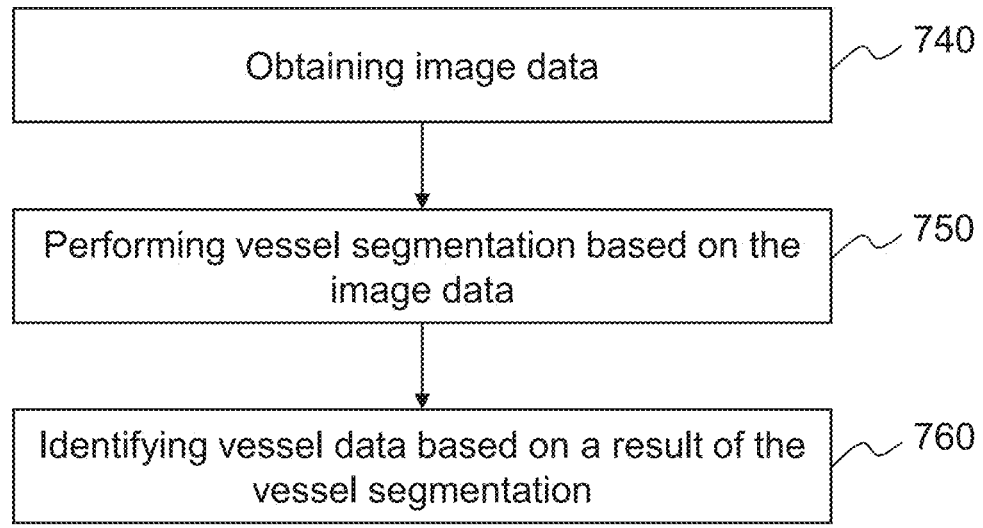
FIG. 7-B

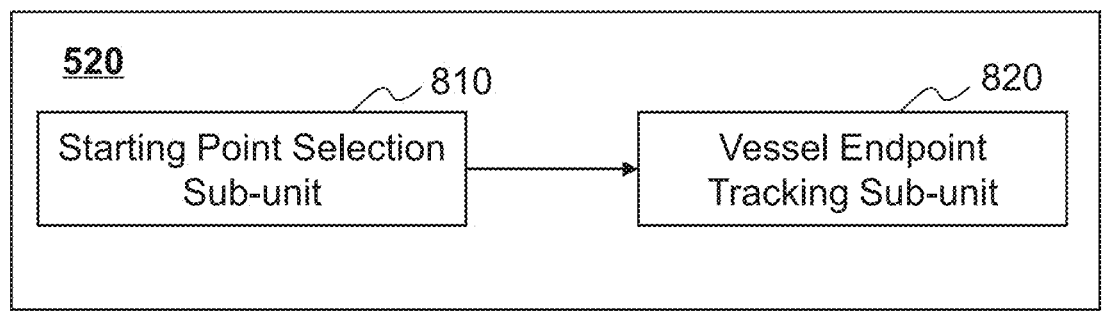
FIG. 8-A
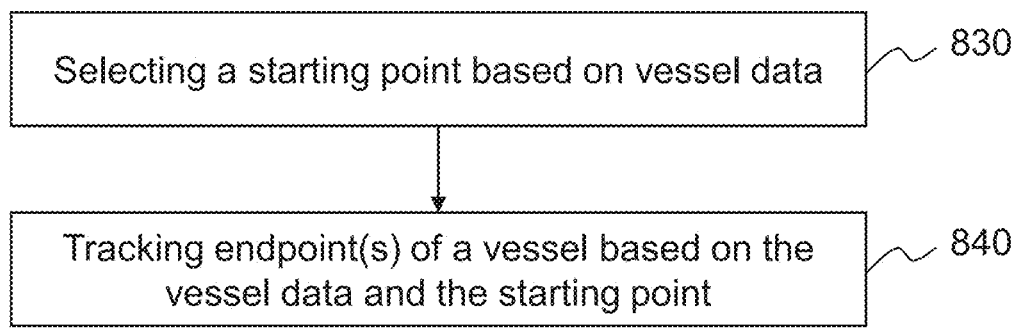
FIG. 8-B

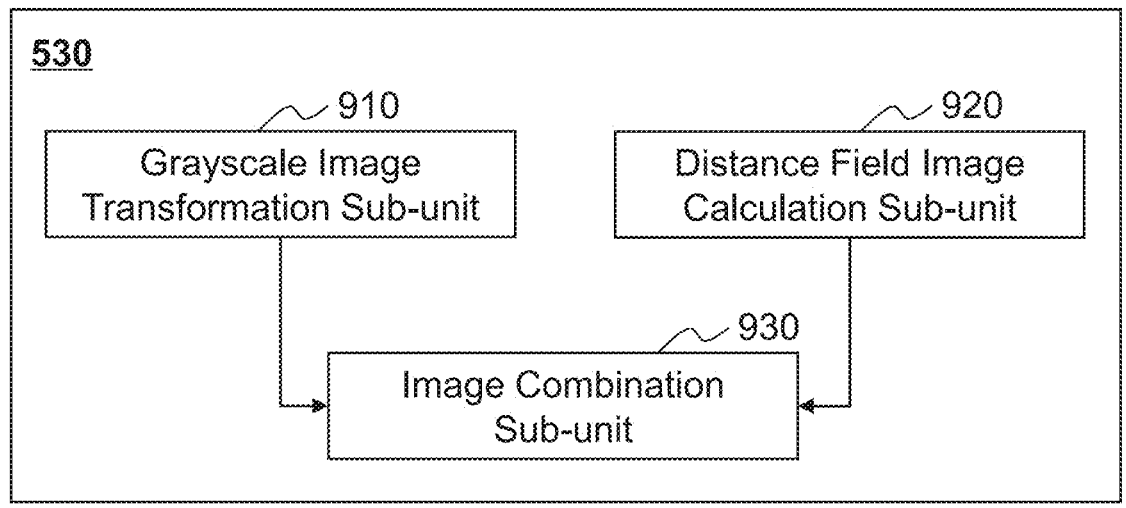
FIG. 9-A
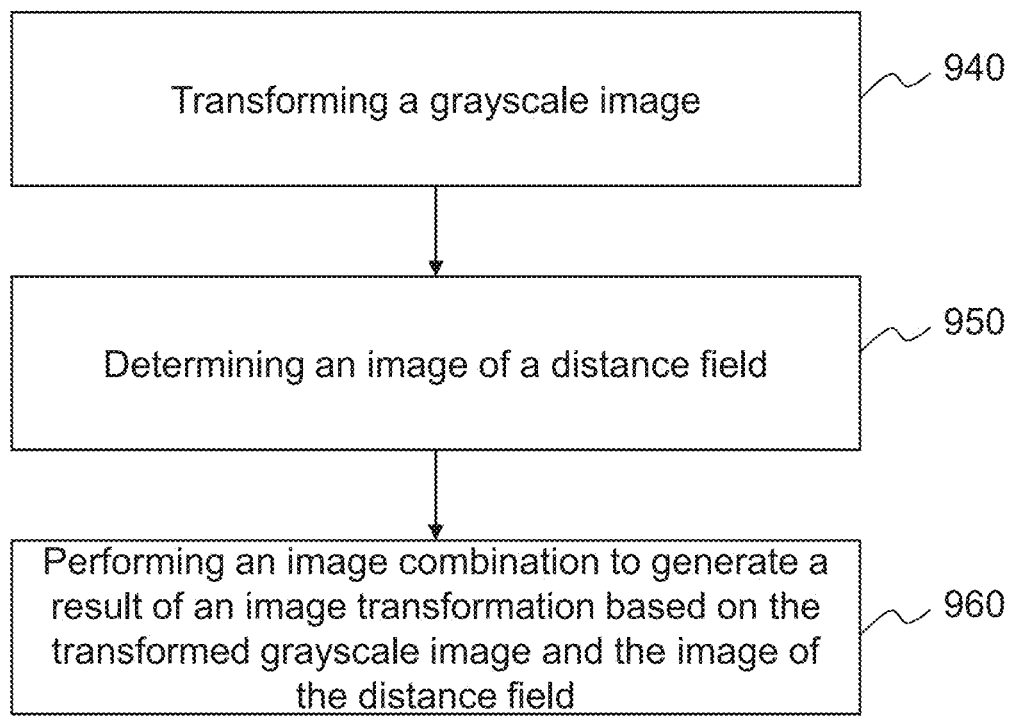
FIG. 9-B

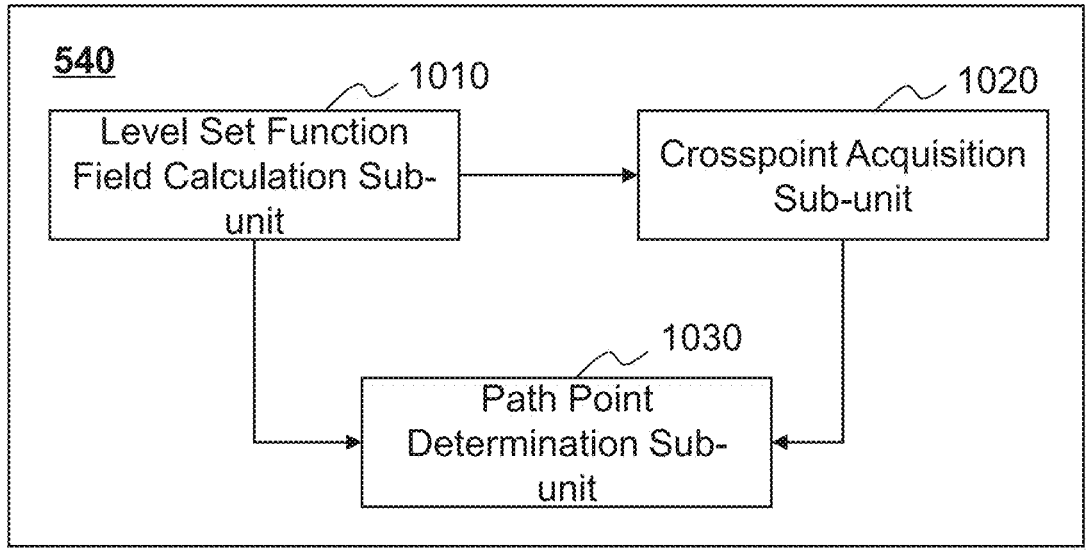
FIG. 10-A
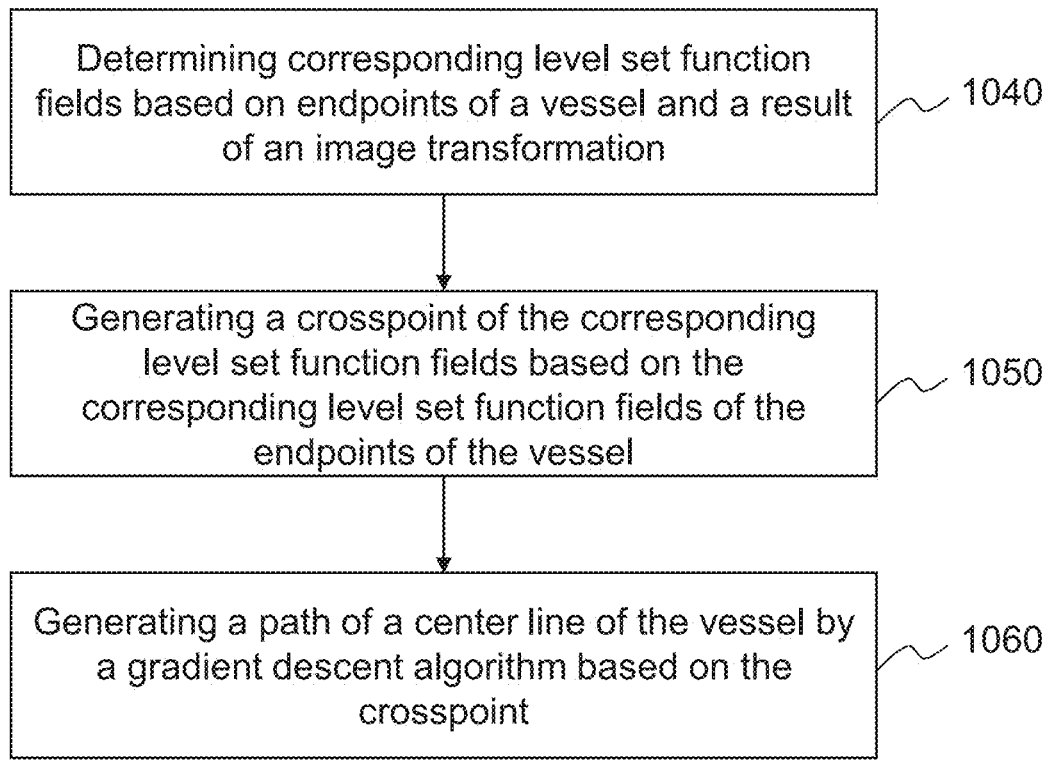
FIG. 10-B

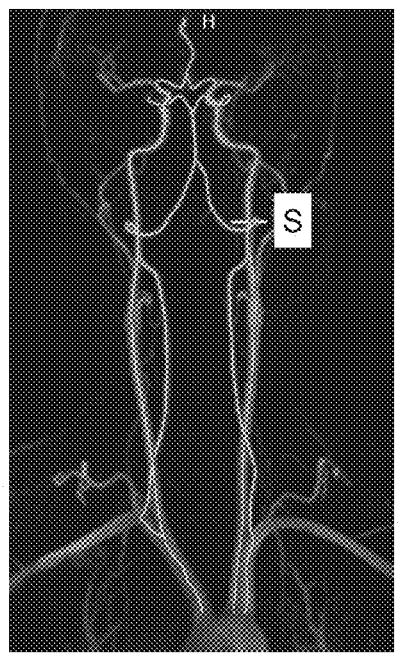
FIG. 11-A
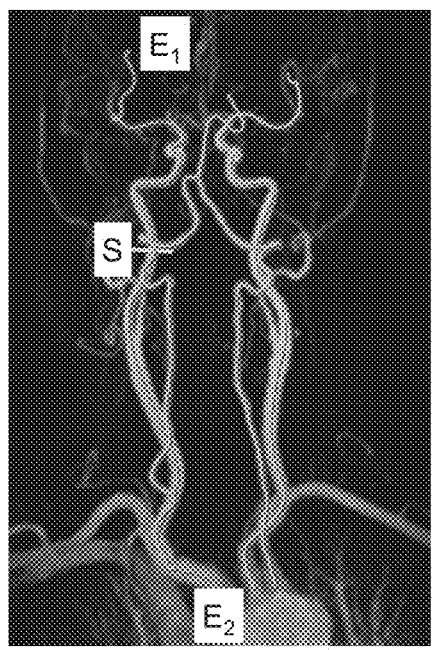
FIG. 11-B

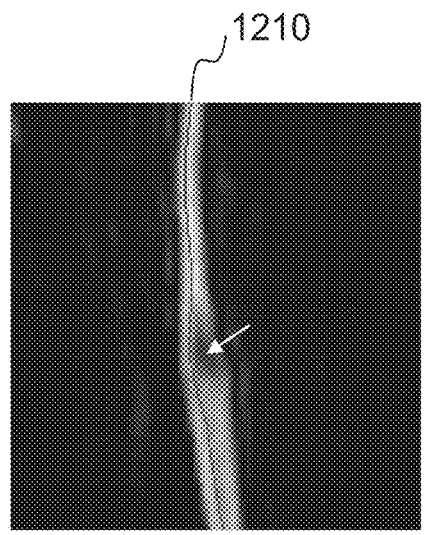
FIG. 12-A
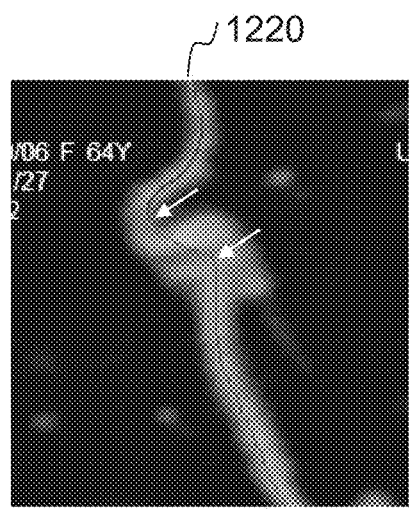
FIG. 12-B
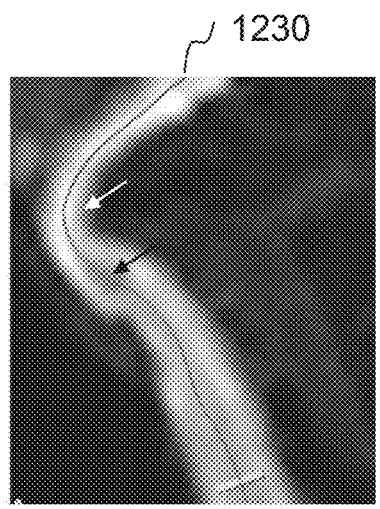
FIG. 12-C 200,059 B2

METHODS AND SYSTEMS FOR DETECTING A CENTERLINE OF A VESSEL

CROSS-REFERENCE TO RELATED APPLICATIONS

This application is a continuation of International Application No. PCT/CN2016/097294, filed on Aug. 30, 2016, which claims priority to the following application: Chinese Patent Application No. 201610503509.7 filed on Jun. 30, 2016, the entire contents of which are incorporated herein by reference.

TECHNICAL FIELD

This application generally relates to methods and systems for detecting a centerline of a vessel, and in particular, to methods and systems for automatically detecting a centerline of a vessel based on image transformation techniques for magnetic resonance images of vessels and segmentation techniques for vessels.

BACKGROUND

Imaging plays an important role in the medical field. There are many kinds of imaging technologies including, for example, Digital Subtraction Angiography (DSA), Magnetic Resonance Imaging (MRI), Magnetic Resonance Angiography (MRA), Computed Tomography (CT), Computed Tomography Angiography (CTA), Ultrasound Scanning (US), Positron Emission Tomography (PET), Single-Photon Emission Computed Tomography (SPECT), SPECT-MR, CT-PET, CT-SPECT, DSA-MR, PET-MR, PET-US, SPECT-US, transcranial magnetic stimulation (TMS)—MR, US-CT, US-MR, X-ray-CT, X-ray-PET, X-ray-US, or the like, or any combination thereof. A detection (or "identification," "determination," etc.) of a centerline of a vessel may provide an important basis for segmentation of a vessel, a three-dimensional reconstruction of a vessel, etc. The detection may also provide an essential support for a calculation of a diameter of a vessel, a quantitative analysis of an image of a vessel, etc. The detection of the centerline of the vessel may be performed by detecting a path along the trend of the vessel. To improve the precision of the detection, different methods may be used for detecting centerlines of different vessels. It may ameliorate the disease diagnosis by improving the precision of the detection of the centerline of the vessel.

SUMMARY

One aspect of the present disclosure relates to a method for detecting a centerline of a vessel. The method for detecting the centerline of the vessel may include obtaining image data, wherein the image data may include vessel data; selecting two endpoints of the vessel including a first endpoint of the vessel and a second endpoint of the vessel based on the vessel data; transforming the image data to generate a transformed image based on at least one image transformation function; determining a path of the centerline of the vessel connecting the first endpoint of the vessel and the second endpoint of the vessel to obtain the centerline of the vessel based on the transformed image.

Another aspect of the present disclosure relates to a non-transitory computer readable medium. The non-transitory computer readable medium may include executable instructions. When the executable instructions are executed by at least one processor, may cause the at least one processor to effectuate the method for detecting the centerline of the vessel.

Yet another aspect of the present disclosure relates to a system for detecting a centerline of a vessel. The system for detecting the centerline of the vessel may include at least one processor and the executable instructions.

In some embodiments, the image data may further include data of a vessel mask.

In some embodiments, the method for detecting the centerline of the vessel may further include identifying the vessel data based on the data of the vessel mask.

In some embodiments, the identifying the vessel data may include determining a plurality of connected domains of the data of the vessel mask; dividing a symmetrical region based on a symmetry among the plurality of connected domains; and determining vessel data with the largest connected domain in the symmetrical region.

In some embodiments, the identifying the vessel data may include determining sizes of vessels based on the data of the vessel mask; and identifying a vessel with the largest size among the vessels.

In some embodiments, the image data may further include non-vessel data.

In some embodiments, the method for detecting the centerline of the vessel may further include performing vessel segmentation to obtain the data of the vessel mask based on the image data.

In some embodiments, the performing the vessel segmentation may include determining a feature of an image based on the image data; selecting at least one threshold based on the feature; and selecting the data of the vessel mask from the image data based on the threshold.

In some embodiments, the feature of the image may include a feature of a histogram of the image.

In some embodiments, the performing the vessel segmentation may further include performing a dilation on an image corresponding to the data of the vessel mask based on the selected data of the vessel mask.

In some embodiments, the selecting the endpoints of the vessel may include selecting a starting point based on the vessel data.

In some embodiments, the selecting the two endpoints of the vessel may further include tracking the vessel in a first direction of the vessel to obtain the first endpoint based on the starting point. The first direction of the vessel may be the direction of blood flow in the vessel.

In some embodiments, the selecting the two endpoints of the vessel may further include tracking the vessel in a second direction of the vessel to obtain the second endpoint based on the starting point. The second direction of the vessel may differ from the first direction of the vessel. The second direction of the vessel may be opposite with the first direction of the vessel.

In some embodiments, the selecting the two endpoints of the vessel may further include searching for the first endpoint using a level set algorithm based on the starting point.

In some embodiments, the selecting the two endpoints of the vessel may further include searching for the second endpoint using the level set algorithm based on the starting point.

In some embodiments, the at least one image transformation function may include a grayscale transformation function, a distance field calculation function, or a weighted combination of the grayscale transformation function and the distance field calculation function In some embodiments, the at least one image transformation function may include a first image transformation function and a second image transformation function, the transforming the data image may include transforming the image data to generate a first transformed image based on the first image transformation function; transforming the data of the vessel mask to generate a second transformed image based on the second transformation function; and performing a weighted combination on the first transformed image and the second transformed image to generate the transformed image.

In some embodiments, the determining the path of the centerline of the vessel connecting the first endpoint of the vessel and the second endpoint of the vessel may include determining a level set function field of the first endpoint of the vessel based on the transformed image; determining a level set function field of the second endpoint of the vessel based on the transformed image; determining a crosspoint of the level set function field of the first endpoint of the vessel and the level set function field of the second endpoint of the vessel; performing a calculation, based on the crosspoint, according to the transformed image using a gradient descent algorithm to generate a point of the path of the centerline of the vessel; and determining the centerline of the vessel based on the point of the path of the centerline of the vessel, the first endpoint of the vessel, and the second endpoint of the vessel.

In some embodiments, the transforming the image data may include performing a grayscale transformation on the image data to generate a first transformed image based on a grayscale transformation function; performing a distance field transformation on the data of the vessel mask to generate a second transformed image based on a distance field calculation function; and performing a weighted combination on the first transformed image and the second transformed image to generate the transformed image.

In some embodiments, the grayscale transformation function may be based on an eigenvalue of a grayscale probability distribution.

In some embodiments, the system for detecting the centerline of the vessel may further include the non-transitory computer readable medium.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The drawings described herein provide further understandings for the present disclosure and form a part of the present disclosure. Exemplary embodiments of the present disclosure and the descriptions thereof are used to explain the present disclosure, and not intended to limit the scope of the present disclosure. In the drawings, like reference numerals represent similar structures throughout the several views of the drawings.

FIG. 4-A is a schematic diagram illustrating a processing module according to some embodiments of the present disclosure;

FIG. 4-B is a flowchart illustrating an exemplary process for processing image data according to some embodiments of the present disclosure;

FIG. 7-A is a schematic diagram illustrating a vessel data acquisition unit according to some embodiments of the present disclosure;

FIG. 7-B is a flowchart illustrating an exemplary process for obtaining vessel data according to some embodiments of the present disclosure;

FIG. 8-A is a schematic diagram illustrating a vessel endpoint selection unit according to some embodiments of the present disclosure;

FIG. 8-B is a flowchart illustrating an exemplary process for selecting endpoints of a vessel according to some embodiments of the present disclosure;

FIG. 9-A is a schematic diagram illustrating an image transformation unit according to some embodiments of the present disclosure;

FIG. 9-B is a flowchart illustrating an exemplary process for image transformation according to some embodiments of the present disclosure;

FIG. 10-A is a schematic diagram illustrating a vessel centerline determination unit according to some embodiments of the present disclosure;

FIG. 10-B is a flowchart illustrating an exemplary process for determining a path of a centerline of a vessel according to some embodiments of the present disclosure;

FIG. 11-A and FIG. 11-B illustrate two exemplary images representing identification results of vessels according to some embodiments of the present disclosure; and FIG. 12-A through FIG. 12-C illustrate three exemplary images representing results of centerlines of vessels detected based on different methods according to some embodiments of the present disclosure.

DETAILED DESCRIPTION

Figure 1:
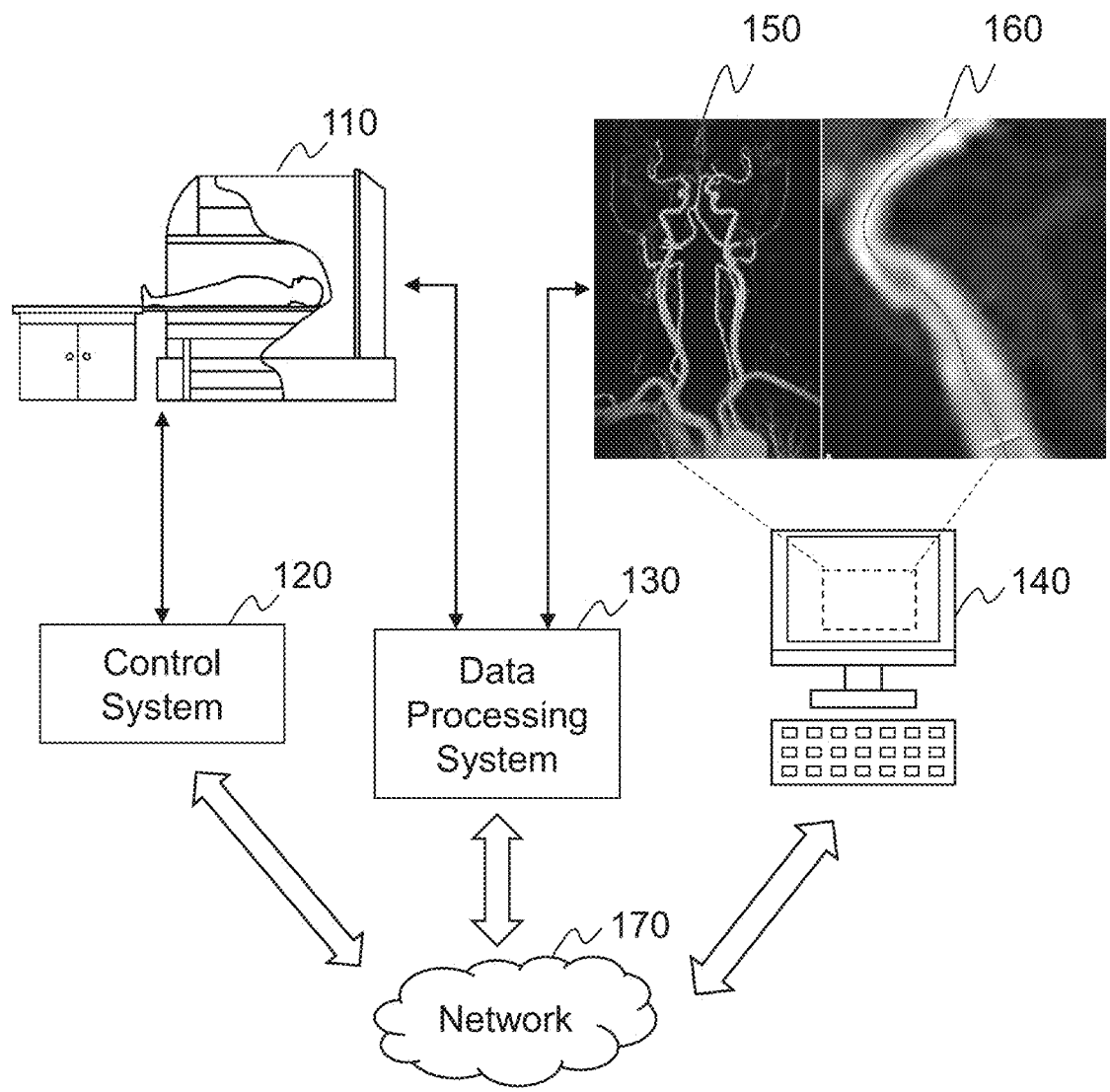
FIG. 1 is a schematic diagram illustrating an imaging system according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure or operation.

As used in the disclosure and the appended claims, the singular forms "a," "an," and "the" include plural referents unless the content clearly dictates otherwise. In general, the terms "comprises," "comprising," "includes," and/or "including" when used in the disclosure, specify the presence of stated steps and elements, but do not preclude the presence or addition of one or more other steps and elements.

Some modules of the data processing system may be referred to in various ways according to some embodiments of the present disclosure, however, any number of different modules may be used and operated in a client terminal and/or a server connected with the system via a network. These modules are intended to be illustrative, and different modules may be used in different aspects of the system and method.

According to some embodiments of the present disclosure, flowcharts are used to illustrate the operations performed by the system. It is to be expressly understood that the operations above or below may or may not be implemented in order. Conversely, the operations may be performed in inverted order, or simultaneously. Besides, one or more other operations may be added to the flowcharts, or one or more operations may be omitted from the flowcharts.

During a process for processing image data, "image segmentation," "image detection," "image classification" may be used interchangeably, each describes selecting images satisfied with a certain condition from a large region. In some embodiments, an imaging system may include one or more types. The types may include but not limited to Digital Subtraction Angiography (DSA), Magnetic Resonance Imaging (MRI), Magnetic Resonance Angiography (MRA), Computed Tomography (CT), Computed Tomography Angiography (CTA), Ultrasound Scanning (US), Positron Emission Tomography (PET), Single-Photon Emission Computed Tomography (SPECT), SPECT-MR, CT-PET, CT-SPECT, DSA-MR, PET-MR, PET-US, SPECT-US, TMS-MR, US-CT, US-MR, X-ray-CT, X-ray-PET, X-ray-US, video-US, video-CT, video-US, or the like, or any combination thereof. In some embodiments, a scanning target for imaging may be an organ, a body, an object, an injured part, a tumor, or the like, or a combination thereof. In some embodiments, the scanning target for imaging may be a head, a chest, an abdomen, an organ, a skeleton, a vessel, or the like, or any combination thereof. In some embodiments, the scanning target may be vessel tissue(s) of one or more parts. In some embodiments, an image may be a two-dimensional image and/or a three-dimensional image. In the two-dimensional image, the smallest distinguishable element may be a pixel. In the three-dimensional image, the smallest distinguishable element may be a voxel. In the three-dimensional image, the image may be composed of a series of two-dimensional slices or two-dimensional image layers.

An image segmentation process may be performed based on corresponding features of pixels (or voxels) of an image. In some embodiments, the corresponding features of the pixels (or voxels) may include a texture structure, a grayscale, an average grayscale, signal strength, a contrast, a brightness, or the like, or any combination thereof. In some embodiments, spatial position features of the pixels (or voxels) may also be used in the image segmentation process.

It should be noted that the above description of the image data processing system is provided for the purpose of illustration, and not intended to limit the scope of the present disclosure. For persons having ordinary skills in the art, after understanding the principle of the system, without deviating from the principle, may make various combinations of the modules, or construct a sub-system to connect with other modules, or modify or change the forms and details of the application fields in which the method and system above is applied.

FIG. 1 is a schematic diagram illustrating an imaging system according to some embodiments of the present disclosure. The imaging system may include an imaging device 110, a control system 120, a data processing system 130, an input/output device 140, and a network 170.

The imaging device 110 may scan a target object and generate data and an image associated with the target object. The imaging device 110 may further process the image based on the generated data. In some embodiments, the imaging device 110 may be a single device or a group of devices. In some embodiments, the imaging device 110 may be a medical imaging device, for example, a PET device, a SPECT device, a CT device, an MRI device, etc. In some embodiments, the device may be used independently, or used in combinations (e.g., a PET-CT device, a PET-MRI device, or a SPECT-MRI device, etc.). In some embodiments, the imaging device 110 may include a scanner used to scan the target object and obtain information associated with the target object (e.g., data, etc.). In some embodiments, the imaging device 110 may be a radiation scanning device. The device may include a radiation scanning source that can emit radiation to the target object. The radiation may include a particle ray, a photon ray, or the like, or any combination thereof. The particle ray may include a neutron, a proton, an a-ray, an electron, a heavy ion, or the like, or any combination thereof. The photon ray may include an X-ray, a y-ray, an ultraviolet ray, a laser, or the like, or any combination thereof. In some embodiments, the photo ray may be an X-ray, the corresponding imaging device 110 may be a CT system, a digital radiography (DR) imaging system, a multi-modality medical imaging system, or the like, or any combination thereof. In some embodiments, the multi-modality medical imaging system may include a CT-PET system, a SPECT-MRI system, or the like, or any combination thereof. In some embodiments, the imaging device 110 may include a radiation generation unit and a radiation detection unit (not shown). For example, the imaging device 110 may include a photon detector used to generate and/or detect rays. The photon detector may generate photons for scanning the target object, or capture photons after scanning the target object. In some embodiments, the imaging device 110 may be an MRI system or a multi-modality medical imaging system, the photon detector thereof may include a scintillator and/or a photoelectric detector.

The control system 120 may be used to control the imaging device 110, the input/output device 140, and/or the data processing system 130. In some embodiments, the control system 120 may control a photoelectric detector of the imaging device 110. The control system 120 may receive information from the imaging device 110, the input/output device 140, and/or the data processing system 130, or output information to the above systems/devices. In some embodiments, the control system 120 may receive image signals or data associated with the target object from the imaging device 110. The control system 120 may transmit the image signals or the data associated with the target object to the data processing system 130. The control system 120 may receive processed data or reconstructed images from the data processing system 130. The control system 120 may transmit the processed data or the reconstructed images to the input/output device 140. In some embodiments, the control system 120 may include a computer, a program, an algorithm, software, a storage device, a port, etc. The port may include ports among the imaging device 110, the input/ output device 140, the data processing system 130, and/or other modules or units of the imaging system.

In some embodiments, the control system 120 may receive a command provided by a user (e.g., a doctor, an imaging technician, etc.). The control system 120 may receive the command provided by the user via the input/output device 140. The control system 120 may control the imaging device 110, the input/output device 140, and/or the data processing system 130 by receiving the command or converting the command. For example, the control system 120 may process data inputted by the user via the input/output device 140, and convert the data to one or more corresponding commands. The command may be a scanning time, location information of the target object, a rotating speed of the gantry, a scanning parameter, or the like, or any combination thereof. The control system 120 may control the data processing system 130 to select different algorithms to process the image data.

The data processing system 130 may process information received from the imaging device 110, the control system 120, the network 170, and/or the input/output device 140. In some embodiments, the data processing system 130 may generate one or more MRI images based on the information. The data processing system 130 may transmit images to the input/output device 140. The data processing system 130 may perform various kinds of operations associated with data processing, for example, data preprocessing, data transformation, data cleaning, data fitting, data weight processing, or the like, or any combination thereof. The data processing system 130 may implement the data processing based on various algorithms and programs, for example, a Fourier transformation, a filtered back projection, an iterative reconstruction, a histogram expansion calculation, an image data function optimization, a level set function calculation, or the like, or any combination thereof. In some embodiments, the data processing system 130 may process data associated with image data of a vessel. For example, the data processing system 130 may detect a centerline 150 of a vessel in a head and neck region, a centerline of a vessel in an abdomen, or a centerline 160 of a vessel in other parts. In some embodiments, a grayscale histogram of a vessel may include data impurities that may have impact on overall effect of the data. The data processing system 130 may perform a data expansion based on one or more algorithms and programs to eliminate voids. The data processing system 130 may segment the vessel based on algorithms to obtain corresponding data of a vessel mask. The data processing system 130 may track endpoints of the vessel based on algorithms (e.g., a level set algorithm). The data processing system 130 may further process the image data of the vessel based on one or more image transformation functions.

In some embodiments, the data processing system 130 may generate control signals associated with the imaging device 110. In some embodiments, data results processed by the data processing system 130 (and/or raw data) may be transmitted to other modules or units of the system. The other modules or units may be a database (not shown), a terminal (not shown) of the network 170. The data processing system 130 may provide a storage capability for the raw data and/or the processed data. In some embodiments, data information of the data processing system 130 may be treated as data information to be further processed, and may be transmitted to a corresponding storage for storing, or may be transmitted to a terminal.

The input/output device 140 may receive, transmit, or display information. In some embodiments, the input/output device 140 may include a keyboard, a touch-enabled device, a mouse, an audio input device, an image input device, a remote controller, or the like, or any combination thereof. The input/output device 140 may input or output programs, software, algorithms, data, text, numbers, images, audios, or the like, or any combination thereof. In some embodiments, a user may input some original parameters or set an initialization condition corresponding to an image processing. In some embodiments, some input information may be from external data sources (e.g., a floppy disk, a hard disk, an optical disk, a storage chip, a wired terminal, a wireless terminal, or the like, or any combination thereof.). The input/output device 140 may receive information from other modules or units of the system, or transmit information to the other modules or units of the system. In some embodiments, the input/output device 140 may transmit the information to a terminal (e.g., a display, a printer, a storage device, a calculating device, or the like, or any combination thereof.). In some embodiments, the input/output device 140 may include a graphical user interface to display periodicity information of the imaging process, or results of the image processing (e.g., a histogram of an image, a vessel mask, images associated with vessels after an image transformation, or the like, or any combination thereof.). The graphical user interface may provide a prompt to the user for inputting parameters, or may allow the user to participate the data processing (e.g., start or end the processing, select or modify operation parameters, select or modify algorithms, modify programs, log out the system, maintain the system, upgrade the system, or update the system, etc.).

The network 170 may be a single network or a combination of different networks. For example, the network 170 may be a local area network (LAN), a wide area network (WAN), a public switched telephone network (PSTN), a virtual network (VN), or any combination thereof. The network 170 may include multiple network access points, and may utilize a wired network architecture, a wireless network architecture, and a combination of the wired or wireless network architecture. The wired network may include a metal cable, a hybrid cable, an optical cable, or the like, or any combination thereof. The wireless network may include a Bluetooth network, a Wi-Fi network, a Zigbee network, a near field communication NFC) network, a cellular network (e.g., GSM, CDMA, 3 G, 4 G, etc.), or the like, or any combination thereof. The network 170 may be suitable for the present disclosure, but not intended to be limiting.

In some embodiments, the imaging device 110, the control system 120, the data processing system 130, and the input/output device 140 may be connected with each other directly or indirectly. In some embodiments, the imaging device 110, the control system 120, the data processing system 130, and the input/output device 140 may be connected with each other directly via the network 170. In some embodiments, the imaging device 110, the control system 120, the data processing system 130, and the input/output device 140 may be connected with each other indirectly via one or more intermediate units (not shown). The intermediate unit may be an entity or a non-entity (e.g., radio wave, optical, sonic, electromagnetic, or the like, or any combination thereof.). Different modules and units may be connected via a wireless manner and/or a wired manner.

It should be noted that the above description of the image processing system is provided merely for the purpose of illustration, and is not intended to limit the scope of the present disclosure. For persons having ordinary skills in the art, after understanding the principle of the system, without departing the principle, may make any combination of the modules, or construct a sub-system connected with other modules, or may modify or change the forms and details of the application field in which the above method and system is applied. The MRI system is merely an embodiment of the imaging device 110, and not intended to limit the scope of the present disclosure. The MRI system may be applied in different scenarios, for example, medicine or industrial, etc. In some embodiments, the MRI system may use the detecting results for different analyses. For example, the MRI may be used in a diagnostic analysis, a security scan, a defect detection, a quantitative analysis, an invalid analysis, or the like, or any combination thereof.

Figure 2:
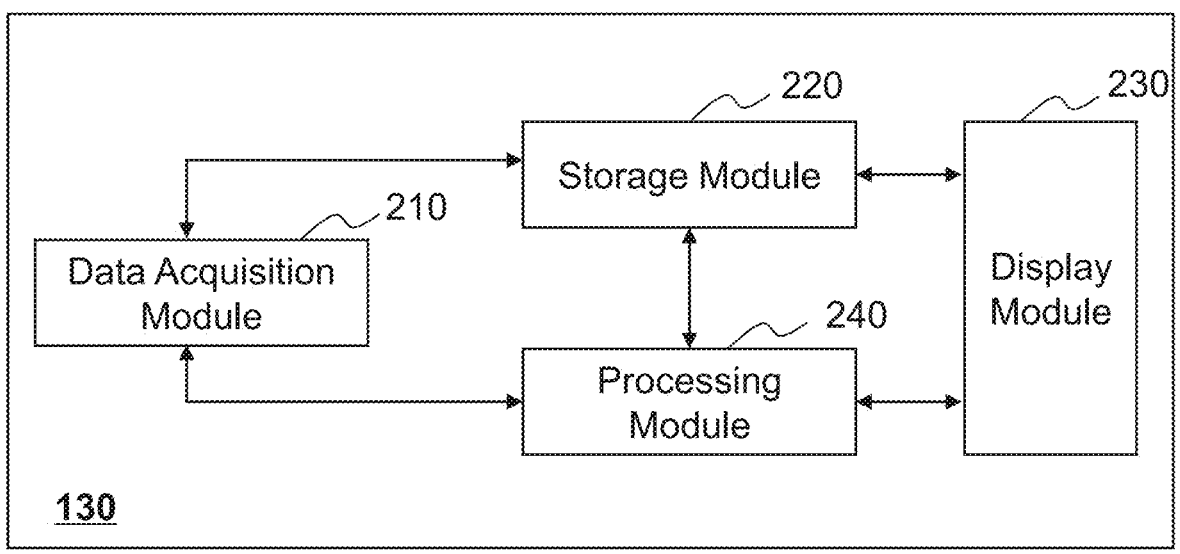
FIG. 2 is a schematic diagram illustrating a data processing system according to some embodiments of the present disclosure.

FIG. 2 is a schematic diagram illustrating a data processing system 130 according to some embodiments of the present disclosure. The data processing system 130 may include a data acquisition module 210, a storage module 220, a display module 230, and a processing module 240. The modules may be connected with each other directly (and/or indirectly).

The data acquisition module 210 may obtain data. The data obtained may be from the imaging device 110 and/or the control system 120. In some embodiments, the data may be obtained from an external data source via the network 170. The data may be three-dimensional image data and/or two-dimensional image data. The data may be data of a specific part that may be set according to checking requirements, for example, a panoramic scanning of the target object, chest of the target object, lung of the target object, bronchi of the target object, vessels of the target object, innervation of the target object, or the like, or any combination thereof. In some embodiments, the data acquisition module 210 may obtain original data of an image of a vessel, data of a processed image of the vessel, or parameters used to process the image of the vessel.

The storage module 220 may store data or information. The data or information stored may be from the imaging device 110, the control system 120, and/or other modules/units of the data processing system 130 (the data acquisition module 210, the display module 230, the processing module 240, or other related modules (not shown)). The formats of the data or information may be various, for example, data, signals, images, related information of the target object, commands, algorithms, programs, or the like, or any combination thereof. In some embodiments, the stored data may be an image of a vessel, parameters of the image of the vessel, the data of the processed image of the vessel, or programs and/or algorithms used for the processing of the image of the vessel, etc. The storage module 220 may include a hard disk, a floppy disk, a random access memory (RAM), a dynamic random access memory (DRAM), a static random access memory (SRAM), a bubble memory, a thin film memory, a magnetic plated wire memory, a phase change memory, a flash memory, a cloud disk, or the like, or any combination thereof. The storage module 220 may provide a temporary storage for the data, that is, transfer the data for next data processing. The storage module 220 may provide a long-term storage for the data, that is, store final results of the data processing. The storage module 220 may be a stationary storage system (e.g., a magnetic disk, etc.), and/or a movable storage system (e.g., a USB interface, an interface of a FireWire port, and/or a drive of disk drive class, etc.), etc. The storage module 220 may be connected with one or more data acquisition modules 210, display modules 230, processing modules 240, or other related modules (not shown). In some embodiments, the storage module 220 may selectively access to one or more visual storage sources (e.g., a cloud storage, a virtual private network and/or other virtual storage sources) via the network 170.

The display module 230 may display data. The displayed data may be from the data acquisition module 210, the storage module 220, and/or the processing module 240, etc. The displayed data may be transmitted to the input/output device 140. In some embodiments, the display module 230 may transmit image data obtained by the processing module 240 to a terminal to be displayed. In some embodiments, the display module 230 may directly display related data information received from the network 170 or the storage module 220. The displayed data may be presented in various forms including, a voice manner (e.g., voice) and/or a vision manner (e.g., text, videos, graphs, etc.), or the like, or any combination thereof. For example, the data may be broadcasted via a headphone, a loudspeaker, etc., displayed on a display screen, printed by a printer, or the like, or any combination thereof. The formats of the displayed data may be various, including numbers, signals, images, related information of the target object, commands, algorithms, programs, or the like, or any combination thereof. In some embodiments, the display module 230 may display an image including information of a vessel (e.g., a histogram, a grayscale image of the vessel, an image of a vessel mask, an image of the vessel obtained by coarse segmentation, an image of the vessel obtained by fine segmentation, etc.).

The processing module 240 may perform relevant processing of data, and construct a corresponding image based on the data. The data may be from the data acquisition module 210, the storage module 220, and/or other modules not shown. The data may be external data resource obtained via the network 170. The constructed image may be transmitted to the display module 230, etc. Data processed by the processing module 240 may be data associated with a specific part of the target object, for example, a brain, a heart, a vessel, a lung, bronchus, or the like, or any combination thereof. In some embodiments, the processing module 240 may process data associated with the vessel. The processing module 240 may process the data based on a plurality of modes including, a mode under which data parameters may be selected, an automatic processing mode, a program processing mode, a function processing mode, or the like, or any combination thereof. In some embodiments, the user may select data needed to be processed, for example, the user may select vessels of a specific part in an image to be processed. In some embodiments, the function processing mode may be a pre-processing of image data of a vessel based on histogram fitting, a processing of image data based on a function transformation, a processing of image data based on a weighted calculation, or the like, or any combination thereof. The processing of the image data may include an image preprocessing, image coarse segmentation, a tracking for a feature point of an image, and/or an image transformation, etc. Under the program processing mode, different program processing methods may be selected at different stages, the data processing may be performed for different requirements. The function processing mode may include various function processing methods including, a level set function algorithm, a gradient descent algorithm, an exponential function transformation algorithm, a histogram data expansion function fitting, or the like, or any combination thereof.

The processing module 240 may include a general processor. The processor may include a programmable logic device (PLD), a special integrated circuit (ASIC), a microprocessor, a system on chip (SoC), a digital signal processor (DSP), or the like, or any combination thereof. In some embodiments, two or more processors may be integrated on a hardware device. In some embodiments, two or more hardware devices may be independent with each other or connected with each other. The processor may implement data processing in multiple ways, for example, in a hardware way, a software way, or a combination of the hardware way and the software way, etc.

It should be noted that the above description of the data processing system 130 is provided for the purpose of illustration, and is not intended to limit the scope of the present disclosure. For persons having ordinary skills in the art, after understanding the principle of the system, without departing the principle, may make any combination of the modules, or construct a sub-system connected with other modules, or may modify or change the forms and details of the application field in which the above method and system is applied.

Figure 3:
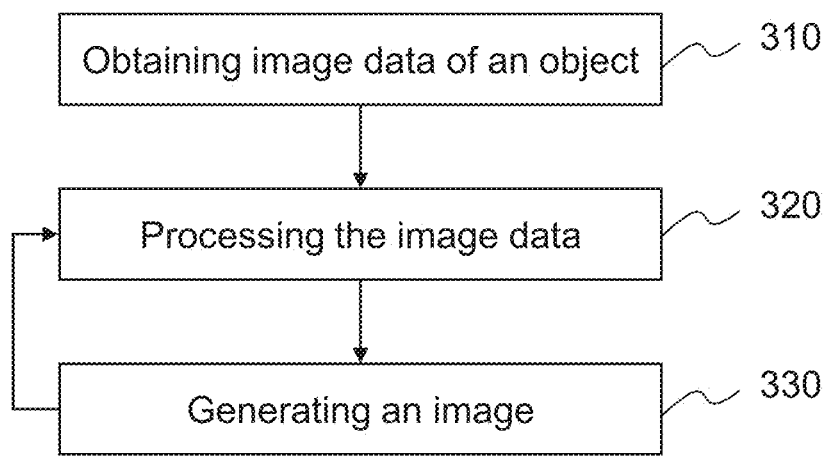
FIG. 3 a flowchart illustrating an exemplary process for generating an image according to some embodiments of the present disclosure.

FIG. 3 is a flowchart illustrating an exemplary process for generating an image according to some embodiments of the present disclosure. In some embodiments, the process for generating the image may be implemented by the data processing system 130. The process for processing the image data may include obtaining image data of an object 310, processing the image data 320, and generating an image 330.

In step 310, the image data of an object may be obtained. The object may be a body, an animal, or a part thereof, for example, an organ, a tissue, a lesion location, a tumor location, or any combination thereof. For example, the object may be a head, a breast, an abdomen, a heart, a liver, an upper limb, a spine, a skeleton, a vessel, or the like, or any combination thereof. The image data of the object may be two-dimensional image data or three-dimensional image data. The three-dimensional image data may refer to data corresponding to the minimum unit of an image (i.e., a voxel), and the two-dimensional image data may refer to data corresponding to the minimum unit of an image (i.e., a pixel). The image data of the object may be MRI image data, CT image data, and/or PET image data, or the like, or any combination thereof. In some embodiments, the acquisition of the image data of the object may be implemented by the data acquisition module 210. In some embodiments, the image data of the object may be obtained from the storage module 220. In some embodiments, the image data of the object may be obtained from an external data source via the network 170. In some embodiments, the image data of the object may be obtained from the input/output device 140.

In step 320, the obtained image data of the object may be processed. The processing of the image data may include one or more sub-steps. In some embodiments, the processing of the image data may be implemented by the processing module 240. In some embodiments, the processing of the image data may include eliminating unreliable data or modifying data values. In some embodiments, the processing of the image data may include filtering data noise(s). In some embodiments, the process of processing the image data in step 320 may include segmenting an image, rendering the image, transforming the image, etc. In some embodiments, the processing of the image data may be based on one or more algorithms, such as a region growing algorithm, a level set algorithm, a gradient descent algorithm, or the like, or any combination thereof.

In step 330, an image may be generated based on the image data processed in step 320. The image generation step may be implemented by the display module 230 or the processing module 240. The image generation step may be based on one or more algorithms, for example, an image transformation algorithm, an image display algorithm, or the like, or any combination thereof. The image transformation algorithm may include a transformation from frequency domain to image domain, a grayscale image transformation, etc. The image display algorithm may include algorithms used for adjusting the color of the image, the contrast of the image, the brightness of the image, etc.

It should be noted that the above description of the process for generating the image is merely provided for the purpose of illustration, and is not intended to limit the scope of the present disclosure. Obviously, for persons having ordinary skills in the art, after understanding the general principle of the process for generating an image, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. In some embodiments, step 320 and 330 may be combined into an independent step. In some embodiments, after performing the image generation step 330, the process for processing the image data may return back to step 320 to further process the image data. In some embodiments, one or more steps may be added into the process, or omitted from the process. For example, before step 310, a step in which the object may be scanned may be added. The scanning of the object may be performed by the imaging device 110. As another example, among or after steps 310, 320, and/or 330, a data storing step may be added. The data may be stored in the storage module 220.

FIG. 4-A is a schematic diagram illustrating a processing module 240 according to some embodiments of the present disclosure. The processing module 240 may include a preprocessing sub-module 410, a vessel characteristic line detection sub-module 420, and a visualization sub-module 430.

The preprocessing sub-module 410 may preprocess image data. The preprocessing of the image data may make data more suitable for detecting a characteristic line of a vessel. The preprocessing of the image data may include image normalization, image reconstruction, image smoothing, image enhancement, image matching, image registration, image geometric rectification, or eliminating saltation or noises in an image, or the like, or any combination thereof. In some embodiments, the preprocessing sub-module 410 may be unnecessary.

The vessel characteristic line detection sub-module 420 may detect a characteristic line of the vessel. The characteristic line of the vessel may refer to one or more lines, points, or any combination thereof that can describe characteristics of the vessel, for example, a centerline of the vessel, a boundary line of the vessel, a starting point, an endpoint of the vessel, etc. The characteristic line of the vessel may be a set of one or more pixels (or voxels) located inside the vessel or at the boundary of the vessel. In some embodiments, the centerline of the vessel may refer to a line that is located at or near the center part of the vessel, and/or represents the trend of the vessel. In some embodiments, the centerline of the vessel may refer to a line connecting pixels (or voxels) that are equally distant from the boundary of the vessel. In some embodiments, the boundary line of the vessel may refer to a line located at or near the wall of the vessel, which may represent a boundary between a vessel and a region with no vessels. In some embodiments, the boundary line of the vessel may include an end of the vessel.

The vessel may include a set including the boundary line of the vessel and pixels (or voxels) inside the boundary line of the vessel. In some embodiments, the starting point may be one or more pixels (or voxels) selected for tracking the endpoint(s) of the vessel. In some embodiments, the starting point may be one or more pixels (or voxels) located inside the vessel or at the boundary of the vessel. For example, the starting point may be located at the center of the vessel or a position near the center of the vessel. As another example, the starting point may be located at the boundary of the vessel or a position near the boundary of the vessel. In some embodiments, the starting point may be an endpoint of the vessel. The endpoint of the vessel may refer to one or more pixels (or voxels) located in the end of the vessel. In some embodiments, the endpoint of the vessel may be located at the boundary of the vessel in the end of the vessel. In some embodiments, a vessel may include two endpoints. In some embodiments, for a vessel with bifurcation(s), it may include three or more endpoints. In some embodiments, a vessel may include two endpoints, and the two endpoints may be located at different positions of the vessel. For example, the two endpoints may be located at two ends of the vessel respectively. In some embodiments, a vessel may include one endpoint. For example, the endpoint may be located at one end of the vessel. In some embodiments, the end of the vessel may refer to an end of the vessel in anatomy. In some embodiments, the end of the vessel may refer to an end of the vessel within a range set by a user, for example, an end of the vessel within a display range of an image. In some embodiments, the end of the vessel may refer to an end of a vessel or an end of a part of the vessel that a user is interested in. In some embodiments, an endpoint of the vessel may be located at the end of the vessel or the end of a part of the vessel, and the endpoint of the vessel may be located inside a vessel (if any) in the extension direction of the vessel. In some embodiments, the centerline of the vessel may be obtained based on one or more endpoints of the vessel. For example, the endpoint(s) of the vessel may be identified first, and then the centerline of the vessel may be detected. The centerline of the vessel may include two or more endpoints of the vessel, only one endpoint of the vessel, or no endpoint of the vessel, etc. In some embodiments, the centerline of the vessel may be obtained by connecting point(s) inside the vessel and one (or more) endpoint(s) of the vessel. In some embodiments, the centerline of the vessel may be obtained by connecting point(s) inside the vessel and/or point(s) near the endpoints of the vessel.

In some embodiments, the vessel characteristic line detection sub-module 420 may include a storage unit, which may be used to store one or more programs or algorithms, for example, a threshold-based segmentation method, an edge-based segmentation method, a region-based segmentation method, a clustering-based segmentation method, a wavelet transform-based segmentation method, a method based on mathematic morphology, a method based on artificial neural networks, a method based on genetic algorithms, etc.

The visualization sub-module 430 may perform a visualization processing on the image data. The visualization sub-module 430 may transform the image data to a visualization format. A visual image may be a grayscale image or a color image. The visual image may be a two-dimensional image or a three-dimensional image. The visual image may be displayed via the input/output device 140 or printed by a printer, etc. In some embodiments, the image data used for the visualization processing may be obtained from the preprocessing sub-module 410 and/or vessel characteristic line detection sub-module 420.

FIG. 4-B is a flowchart illustrating an exemplary process for processing image data according to some embodiments of the present disclosure. The process for processing the image data may include a step 440 for preprocessing data, a step 450 for detecting a characteristic line of a vessel, and a step 460 for generating an image of the characteristic line of the vessel.

In step 440, data may be preprocessed. The data preprocessing may be implemented by the preprocessing sub-module 410. The data preprocessing may include an image smoothing processing, an image enhancement processing, or the like, or a combination thereof. The smoothing processing may be a smoothing processing in image domain or in frequency domain. In some embodiments, the smoothing processing in image domain may be performed directly on pixels (or voxels) of an image. In some embodiments, the smoothing processing in frequency domain may include transforming values in image domain to values in frequency domain, processing the values in frequency domain, and transforming the values in frequency domain to values in image domain. The image smoothing processing may include median smoothing, Gaussian smoothing, mean value smoothing, normalization smoothing, bilateral filtering smoothing, or the like, or any combination thereof.

In step 450, a characteristic line of a vessel may be detected. The detection of the characteristic line of the vessel may be implemented by the vessel characteristic line detection sub-module 420. The detection of the characteristic line of the vessel may be performed based on the preprocessing result of step 440. In some embodiments, the detection of the characteristic line of the vessel may be performed based on the data directly obtained from the data acquisition module 210, the storage module 220, or the input/output device 140, or the data obtained from an external data source via the network 170. The detection of the characteristic line of the vessel may be performed using one or more algorithms, for example, a gradient descent algorithm, a threshold algorithm, a region growing algorithm, a level set algorithm, a region segmentation and/or growing, an edge tracking segmentation algorithm, a statistical pattern recognition algorithm, a mean value clustering segmentation algorithm, a manual calibration algorithm, a topological thinning algorithm, a distance transformation algorithm, or the like, or any combination thereof. In some embodiments, methods for the detection of the characteristic line of the vessel may be stored in the vessel characteristic line detection sub-module 420, the storage module 220, or a removable storage device (e.g., a mobile hard disk, a USB flash drive, etc.). In some embodiments, methods for the detection of the characteristic line of the vessel may be obtained from one or more external data sources via the network 170.

In step 460, an image of the characteristic line of the vessel may be generated. The image of the characteristic line of the vessel may be generated based on the detection result of the characteristic line of the vessel in step 450. The generation of the image of the characteristic line of the vessel may be implemented by the visualization sub-module 430. In some embodiments, a color image of the characteristic line of the vessel may be generated. In some embodiments, a grayscale image of the characteristic line of the vessel may be generated. In some embodiments, step 460 may include one or more post-processing steps. The post-processing step may be a two-dimensional post-processing technique, for example, a multi-planar reconstruction technique, a surface reconstruction technique, a volume reconstruction technique, a volume rendering technique, or the like, or combination thereof. The post-processing step may be a three-dimensional post-processing technique, for example, a three-dimensional surface reconstruction, a three-dimensional volume reconstruction, a volume intensity projection technique, a maximum intensity projection technique, a minimum intensity projection technique, a mean intensity projection technique, or the like, or any combination thereof. Other possibly used techniques may include a restoration, a rendering, a filling, or the like, or any combination thereof.

It should be noted that the above description of the image processing module and the process for processing the image is provided merely for the purpose of illustration, and should not be designated as the only practical embodiment. Each sub-module above may be implemented via one or more components and the functions of each sub-module are not limited therein. Each sub-module above may be added or omitted based on particular application scenarios. Obviously, for persons having ordinary skills in the art, after understanding the principle of the image data processing, without departing the principle, may modify or change the forms and details of the particular practical ways and steps, and further make simple deductions or substitutions, or may make modifications or combinations of some sub-modules and/or processing steps without further creative efforts. However, those variations and modifications do not depart the scope of the present disclosure. For example, the preprocessing sub-module 410 and/or the step 440 for preprocessing data may be unnecessary. As another example, steps 440 and 450 may be combined into an independent step. As still another example, steps 450 and 460 may be performed simultaneously or alternately.

Figure 5:
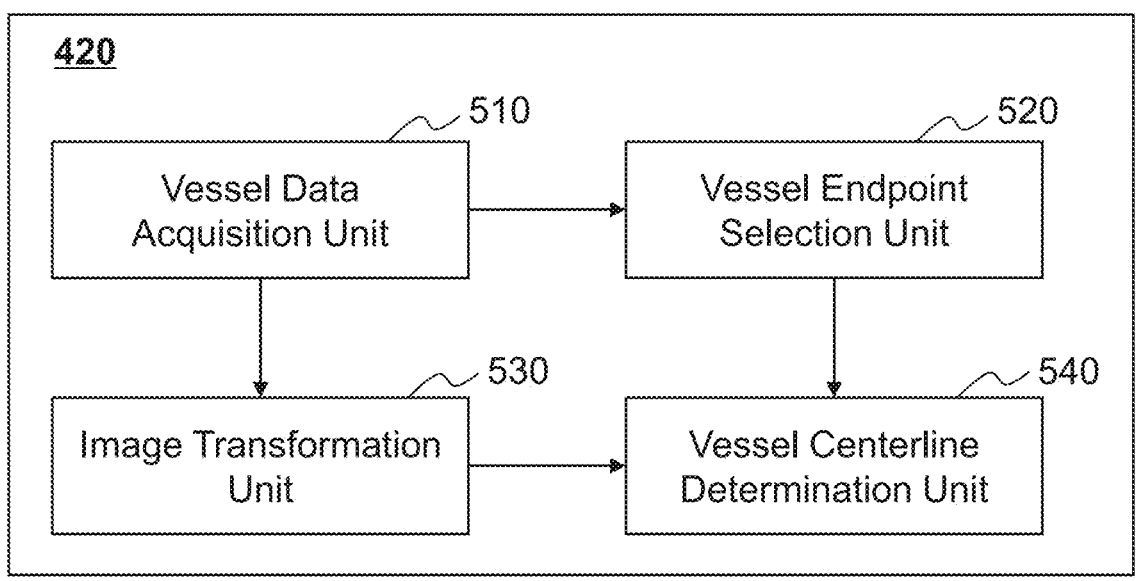
FIG. 5 is a schematic diagram illustrating a vessel characteristic line detection sub-module according to some embodiments of the present disclosure.

FIG. 5 is a schematic diagram illustrating a vessel characteristic line detection sub-module 420 according to some embodiments of the present disclosure. The vessel characteristic line detection sub-module 420 may include a vessel data acquisition unit 510, a vessel endpoint selection unit 520, an image transformation unit 530, and a vessel centerline determination unit 540. Besides the above units, the vessel characteristic line detection sub-module 420 may also include one or more other units. An exemplary connection manner among the units is illustrated in FIG. 5, but is not intended to be limiting.

The vessel data acquisition unit 510 may obtain vessel data. In some embodiments, the vessel data may be data of an artery vessel, a vein vessel, or the like, or any combination thereof. The data of the artery vessel may be data of a head artery, a neck artery, a thoracic artery, an abdominal artery, an axillary artery, a brachial artery, or the like, or any combination thereof. The data of the vein vessel may be data of a head vein, a neck vein, a thoracic vein, a pulmonary vein, or the like, or any combination thereof. In some embodiments, the vessel data may also include data of an arteriole, a venule, and/or a blood capillary, etc. The vessel data may be obtained from the preprocessing sub-module 410, the data acquisition module 210, the storage module 220, the display module 230, and/or obtained via the network 170. In some embodiments, the vessel data may be detected from image data. For example, data of a vessel in head and neck may be detected from image data of the head and neck, data of a vessel in abdomen may be detected from image data of the abdomen, etc. In some embodiments, the vessel data may include non-vessel data surrounding the vessel. The non-vessel data may include data of a muscle tissue, a skeleton, a body organ, etc. For example, the data of a vessel in head and neck may include skeleton data surrounding the neck artery, and data of a vessel in hepatic artery may include data of a hepatic tissue surrounding the hepatic artery.

The vessel endpoint selection unit 520 may select an endpoint of a vessel. An endpoint of a vessel may refer to one or more pixels (or voxels) at an end of a vessel. The endpoint of the vessel may include two endpoints at two ends of the vessel. In some embodiments, for a vessel including bifurcation(s), the vessel may include three or more endpoints of the vessel. In some embodiments, a vessel may be segmented into two or more parts of the vessel, and each part of the vessel may include two endpoints. The selection of the endpoint(s) of the vessel may be based on the vessel data. For example, the endpoint(s) of the vessel may be selected from vessel data of a left (or right) common carotid artery, the endpoint(s) of the vessel may be selected from vessel data of an abdominal aorta, etc. In some embodiments, the selection of the endpoint(s) of the vessel may be based on image data. For example, the endpoint(s) of the vessel of an abdominal aorta vessel may be selected from image data of head and neck.

The image transformation unit 530 may perform a transformation on the image data. The transformation of the image data may be based on the data obtained from the vessel data acquisition unit 510. The image data may include vessel data and/or non-vessel data. The transformation of the image data may include a transformation based on two-dimensional image data and/or a transformation of three-dimensional image data. The transformation of the image data may include a transformation in spatial domain, a transformation in value domain, etc. The transformation in spatial domain may refer to a transformation of the image data in geometrical features, for example, image magnification, reduction, warping, etc. The transformation in value domain may refer to a transformation of pixels (or voxels) of the image data, for example, value compression of the image, enhancements, etc. The transformation of the image data may include an equidimensional transformation, a various-dimensional transformation, etc. The equidimensional transformation may refer to a transformation in a uniform dimensional space. For example, a transformation in a two-dimensional dimension, a transformation in a three-dimensional dimension, etc. The various-dimensional transformation may refer to a transformation in different dimensional spaces. For example, a transformation from two-dimensional space to three-dimensional space, a transformation from three-dimensional space to two-dimensional space, a transformation from a grayscale image to a color image, a transformation from a color image to a grayscale image, etc. The transformation of the image data may include a grayscale transformation, a distance transformation, etc. In some embodiments, an image transformation may be based on one or more transformation functions. For example, a transformation function based on a grayscale probability distribution, a transformation function based on a distance field, or the like, or any combination thereof. In some embodiments, the transformation function may be stored in the image transformation unit 530, and/or the storage module 220, or obtained from the network 170.

The vessel centerline determination unit 540 may determine a path of a centerline of a vessel. The determination of the path of the centerline of the vessel may be based on the data of the image transformation unit 530 and/or the data of the vessel endpoint selection unit 520. In some embodiments, the centerline of the vessel may refer to a line inside the vessel along the trend of the vessel. The centerline of the vessel may include a set of one or more pixels (or voxels) in the vessel. The vessel may include a boundary line of the vessel and a set of pixels (or voxels) inside the boundary line of the vessel. In some embodiments, the centerline of the vessel may include a set of pixels (or voxels) at or near the center of the vessel. In some embodiments, the centerline of the vessel may include one or more endpoints of the vessel. The vessel centerline determination unit 540 may determine a set of pixels (or voxels) located at the centerline of the vessel based on one or more algorithms. The vessel centerline determination unit 540 may determine the set of pixels (or voxels) as the path of the centerline of the vessel and draw the centerline of the vessel based on the path of the centerline of the vessel.

It should be noted that the above description of the vessel characteristic line detection sub-module 420 is provided merely for the purpose of illustration, and should not be designated as the only practical embodiment. Each unit above may be implemented via one or more components and the functions of each unit are not limited therein. Each unit above may be added or omitted based on particular application scenarios. Obviously, for persons having ordinary skills in the art, after understanding the general principle of the detection of the characteristic line of the vessel, without departing the principle, may modify or change the forms and details of the particular practical ways and steps of the vessel characteristic line detection sub-module, and further make simple deductions or substitutions, or may make modifications or combinations of the order of the units without further creative efforts. However, those variations and modifications do not depart the scope of the present disclosure. For example, in some embodiments, a vessel boundary detection unit may be added used for further detecting vessel information. The vessel boundary detection unit may be inside or outside the vessel data acquisition unit 510.

Figure 6:
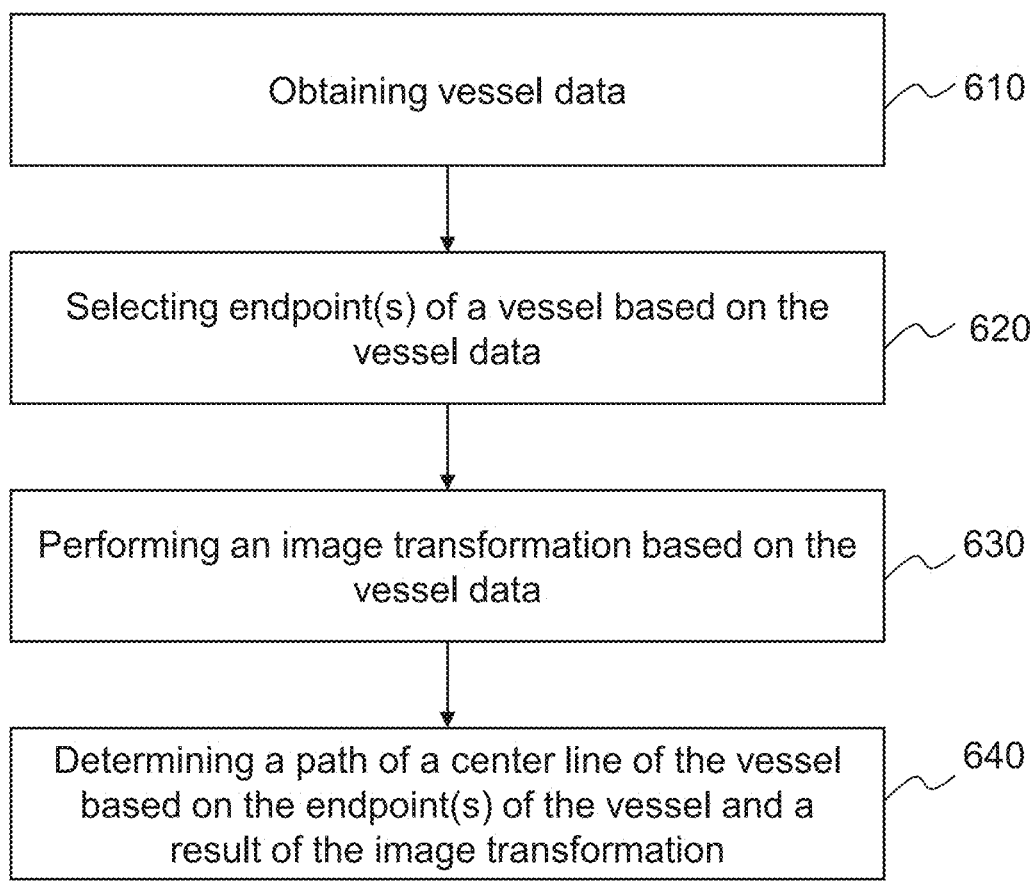
FIG. 6 is a flowchart illustrating an exemplary process for detecting a characteristic line of a vessel according to some embodiments of the present disclosure.

FIG. 6 is a flowchart illustrating an exemplary process for detecting a characteristic line of a vessel according to some embodiments of the present disclosure. The process for detecting the characteristic line of the vessel may include obtaining vessel data 610, selecting endpoints of a vessel 620, performing an image transformation 630, and determining a path of a centerline of the vessel 640.

In step 610, vessel data may be obtained. The vessel data may be directly obtained from the data acquisition module 210, the storage module 220, the display module 230, and/or the pre-processing sub-module 410, or obtained via the network 170. In some embodiments, the vessel data may be detected from image data. For example, vessel data of a left (or right) common carotid artery may be detected from image data of head and neck. Vessel data of an abdominal aorta may be obtained from image data of abdomen. Step 610 may be implemented by the vessel data acquisition unit 510.

In step 620, endpoint(s) of a vessel may be selected. The endpoint(s) of the vessel may be selected based on the vessel data obtained in step 610. In some embodiments, the endpoint(s) of the vessel may refer to two endpoints at two ends of the vessel. For example, the vessel data of the abdominal aorta may be obtained in step 610, in step 620, two endpoints of the abdominal aorta vessel may be selected based on the vessel data of the abdominal aorta. In some embodiments, the endpoint(s) of the vessel may be directly selected based on the vessel data. For example, for a vessel with a relatively large diameter, the endpoint(s) of the vessel may be directly selected. In some embodiments, the endpoint(s) of the vessel may be selected based on one or more algorithms. For example, for a vessel with bifurcation(s), the endpoints of the vessel may be selected based on an image segmentation algorithm, a level set algorithm, etc. The selection of the endpoint(s) of the vessel may be performed automatically, semi-automatically, or manually. For example, the endpoint(s) of the vessel may be automatically selected based on one or more algorithms. As another example, a user or an operator may manually select the endpoint(s) of the vessel via a graphical user interface of the input/output device 140. As still another example, the user or the operator may perform a manual correction or alteration based on the automatically selected endpoint(s) of the vessel, etc. Step 620 may be implemented by the vessel endpoint selection unit 520.

In step 630, an image transformation may be performed. An image may be transformed based on the vessel data obtained in step 610. In some embodiments, the image may be transformed based on the image data of the object obtained in step 310. In some embodiments, the image may be transformed based on the result of the preprocessed data in step 440. In some embodiments, the image transformation may be implemented based on one or more transformation functions. For example, transformation function may include a Fourier transformation function, a wavelet transformation function, a cosine transformation function, an exponential function, a transformation function based on a grayscale probability distribution, a transformation function based on a distance field, or the like, or any combination thereof. Step 630 may be implemented by the image transformation unit 530. In some embodiments, step 630 may be unnecessary.

In step 640, a path of a centerline of the vessel may be determined. The path of the centerline of the vessel may be determined based on the endpoint(s) of the vessel selected in step 620, and/or the result of the image transformation in step 630. In some embodiments, the path of the centerline of the vessel may be determined based on the vessel data obtained in step 610. In step 640, one or more algorithms may be used to determine a set of pixels (or voxels) located at the centerline of the vessel, for example, a gradient descent algorithm, a threshold algorithm, a region growing algorithm, a level set algorithm, a region segmentation and/or merging, an edge tracking segmentation algorithm, a statistical pattern recognition algorithm, a mean clustering segmentation algorithm, a manual calibration algorithm, a topological thinning algorithm, a distance transformation algorithm, or the like, or any combination thereof. In step 640, the set of pixels (or voxels) may be determined as the path of the centerline of the vessel, and the centerline of the vessel may be drawn based on the path of the centerline of the vessel. The determination of the path of the centerline of the vessel may be performed automatically, semi-automatically, or manually. For example, the path of the centerline of the vessel may be automatically determined based on one or more algorithms. As another example, a user or an operator may manually select one or more pixels (or voxels) of the path of the centerline of the vessel via a graphical user interface of the input/output device 140. As still another example, the user or the operator may perform a manual correction or alteration based on the automatically determined path of the centerline of the vessel, etc. Step 640 may be implemented by the vessel centerline determination unit 540.

It should be noted that the above description of the detection of the centerline of the vessel is provided merely for the purpose of illustration, and should not be designated as the only practical embodiment. Obviously, for persons having ordinary skills in the art, after understanding the general principle of the detection of the centerline of the vessel, without departing the principle, may modify or change the forms or details of the particular practical ways and steps of the detection of the centerline of the vessel, and further make simple deductions or substitutions, or may make modifications or combinations of the order of the steps without further creative efforts. However, those variations and modifications do not depart the scope of the present disclosure. In some embodiments, step 620 and step 630 may be exchanged in order. In some embodiments, step 620 and step 630 may be performed simultaneously. In some embodiments, step 620 and step 640 may be combined into an independent step. In some embodiments, after step 640 is completed, the process for detecting the characteristic line of the vessel may return back to step 610. In some embodiments, vessel data may be further obtained based on a result of the centerline of the vessel in step 640. In some embodiments, one or more steps may be added to the process, or one or more steps may be omitted from the process. For example, step 620 may be unnecessary. As another example, a step in which a boundary of the vessel may be detected may be added among step 610, step 620, step 630, and/or step 640.

FIG. 7-A is a schematic diagram illustrating a vessel data acquisition unit 510 according to some embodiments of the present disclosure. The vessel data acquisition unit 510 may include an image data acquisition sub-unit 710, a vessel segmentation sub-unit 720, and a vessel identification sub-unit 730, etc. Besides the above sub-units, the vessel data acquisition unit 510 may also include one or more other sub-units. An exemplary connection manner among the sub-units is illustrated in FIG. 7-A, but is not intended to be limiting.

The image data acquisition sub-unit 710 may obtain image data. The image data may be data associated with a human body, for example, a whole body, a head, a neck, an abdomen, a liver, an upper limb, a lower limb, or the like, or any combination thereof. The image data may include vessel data. In some embodiments, the image data may include non-vessel data. The non-vessel data may be data of a muscle tissue, a skeleton, a body organ, etc. The image data may be obtained from the preprocessing sub-module 410, the data acquisition module 210, the storage module 220, the display module 230, the input/output device 140, and/or the network 170. The image data may be two-dimensional image data and/or three-dimensional image data. In some embodiments, the image data used for vessel segmentation may be MRI image data, CT image data, and/or PET image data, or any combination thereof.

The vessel segmentation sub-unit 720 may perform segmentation on a vessel. In some embodiments, the vessel segmentation may be performed based on image data. In some embodiments, the vessel segmentation sub-unit 720 may detect the vessel data based on the image data. In some embodiments, the vessel segmentation may detect data of one or more vessels from an image. In some embodiments, the vessel segmentation sub-unit 720 may perform coarse segmentation on the vessel based on the image data. The coarse segmentation of the vessel may refer to a coarse detection of the vessel data. The coarse detection may be a detection that the demand for the precision and/or accuracy of the vessel is not too high. For example, the vessel data obtained by the coarse segmentation of the vessel may include information of a small amount of non-vessel data, a small amount of the vessel data may be omitted, a boundary of the vessel may be inaccurate, etc. In some embodiments, the vessel segmentation sub-unit 720 may perform fine segmentation on the vessel based on the image data. The fine segmentation of the vessel may refer to a fine detection of the vessel data. The fine detection may be a detection that the demand for the precision and/or accuracy of the vessel is relatively high. For example, a boundary of the vessel obtained by the vessel fine segmentation may be accurate, the probability that the tissues surrounding the vessel are detected as the vessel may be small, and the probability that the vessel data is omitted may be small, etc. In some embodiments, the vessel segmentation sub-unit 720 may detect data of a vessel mask from the image data. In some embodiments, the data of the vessel mask may be detected by the vessel coarse segmentation. The vessel mask may refer to an image including the image data. In some embodiments, the vessel mask may include a background. The background may refer to a non-vessel region including other tissues (e.g., skeleton, fat, etc.) except vessels, and/or regions outside the object (e.g., a space between an upper limb and a chest, etc.). In some embodiments, the vessel mask may be represented as a binary image. The binary image may refer to an image that the value of pixels (or voxels) is "0" or "1". In the vessel mask, the value "1" may represent the vessel, and the value "0" may represent the background. In some embodiments, the vessel mask may also include a part of non-vessel data, such as data associated with skeleton or fat. In some embodiments, in the vessel mask, the vessel data, the non-vessel data, and the background may be represented by different values, for example, "0", "1", and/or any other real numbers. For example, the value "1" may be used to represent the vessel, the value "0" may be used to represent the background, and the value "2" may be used to represent the skeletons, etc.

The vessel identification sub-unit 730 may identify a vessel. The identification of the vessel may include an identification of a specific vessel, for example, a left (or right) common carotid artery, a left (or right) internal carotid artery, a left (or right) vertebral artery, an abdominal aorta, etc. In some embodiments, the identification of the vessel may be based on a result of the vessel segmentation (e.g., the coarse segmentation of the vessel, and/or the fine segmentation of the vessel, etc.). In some embodiments, the identification of the vessel may be based on the data of the vessel mask. In some embodiments, the identification of the vessel may be based on image data of a specific part, for example, the identification of the vessel in an image of a head and neck, the identification of the vessel in an image of an abdomen, etc. In some embodiments, an identification result of the vessel may only include vessel data without non-vessel data. In some embodiments, the identification result of the vessel may include vessel data and a small amount of non-vessel data.

FIG. 7-B is a flowchart illustrating an exemplary process for obtaining vessel data according to some embodiments of the present disclosure. The process for obtaining the vessel data may include obtaining image data 740, segmenting vessel 750, detecting vessel data 760, etc.

In step 740, image data may be obtained. The image data may be obtained from the preprocessing sub-module 410, the data acquisition module 210, the storage module 220, the display module 230, the input/output device 140, and/or the network 170. Step 740 may be implemented by the image data acquisition sub-unit 710.

In step 750, vessel segmentation may be performed. In some embodiments, step 750 may be based on the image data obtained in step 740. The vessel segmentation may be based on one or more algorithms. A vessel segmentation algorithm may include a threshold algorithm, a region growing algorithm, an algorithm based on an energy function, a level set algorithm, a region segmentation and/or merging, an edge tracking segmentation algorithm, a statistical pattern recognition algorithm, a mean clustering segmentation algorithm, a model algorithm, a segmentation algorithm based on a deformable model, an artificial neural networks method, a minimum path segmentation algorithm, a tracking algorithm, a segmentation algorithm based on a rule, a coupling surface segmentation algorithm, or the like, or any combination thereof. In some embodiments, the vessel segmentation algorithm may be stored in the vessel segmentation sub-unit 720, the vessel data acquisition unit 510, or the storage module 220. Step 750 may be implemented by the vessel segmentation sub-unit 720.

In some embodiments, the vessel segmentation may be based on one or more thresholds T. For example, the vessel segmentation may include the following one or more steps. A histogram of an image may be calculated based on the image data. One or more thresholds may be selected based on a calculated feature of the histogram. Pixels (or voxels) satisfied with the thresholds may be selected based on the thresholds. Further, the vessel segmentation may be implemented. The feature of the histogram may include a shape of the histogram, an area of the histogram, or a distribution of the histogram, etc. In some embodiments, in the process of selecting the thresholds, the histogram may be fitted. Based on different imaging methods, different fitting methods may be used to fit the histogram, or different models may be used to perform the fitting of the histogram. For example, a histogram fitting model may include a Gauss distribution model, a Ruili distribution model, a Weibull distribution model, a K distribution model, a Pealson distribution model, or the like, or any combination thereof.

In step 760, the vessel data may be detected. In some embodiments, a specific vessel may be identified and corresponding vessel data may be detected in step 760. In some embodiments, step 760 may be based on a result of the vessel segmentation in step 750. In some embodiments, the detection of the vessel data may be based on a feature of the vessel. The feature of the vessel may include one or more of the symmetry of the vessel, the size of the vessel (e.g., an area, a diameter, a radius, etc.), a size of a connected domain, a location of the vessel, etc. For example, for vessels of a head and neck region (e.g., left common carotid artery, right common carotid artery, left vertebral artery, right vertebral artery, etc.) with a symmetry, a vessel with the largest connected domain may be determined based on the symmetry, and the four vessels may be identified. As another example, for vessels of an abdomen, the abdominal aorta is the thickest, a vessel with the largest diameter may be determined based on the diameters (or the radiuses) of the vessels, and the abdominal aorta may be identified. Step 760 may be implemented by the vessel identification sub-unit 730.

It should be noted that the above description of the vessel data acquisition unit and the process for obtaining the vessel data is provided merely for the purpose of illustration, and should not be designated as the only practical embodiment. Each unit above may be implemented via one or more components and the functions of each unit are not limited therein. Each unit above may be added or omitted based on particular application scenarios. Obviously, for persons having ordinary skills in the art, after understanding the general principle of the detection of the characteristic line of the vessel, without departing the principle, may modify or change the forms and details of the particular practical ways and steps of the vessel characteristic line detection sub-module, and further make simple deductions or substitutions, or may make modifications or combinations of the order of the units without further creative efforts. However, those variations and modifications do not depart the scope of the present disclosure. For example, the image data acquisition sub-unit 710, and/or step 740 may directly obtain the result of the vessel segmentation, and/or the result of the vessel identification. As another example, the vessel segmentation sub-unit 720, the vessel identification sub-unit 730, step 750, and/or step 760 may be unnecessary.

FIG. 8-A is a schematic diagram illustrating a vessel endpoint selection unit 520 according to some embodiments of the present disclosure. The vessel endpoint selection unit 520 may include a starting point selection sub-unit 810 and a vessel endpoint tracking sub-unit 820.

The starting point selection sub-unit 810 may select a starting point. The starting point may provide a basis for tracking endpoint(s) of a vessel. The starting point may be one or more pixels (or voxels) located inside the vessel. In some embodiments, the starting point may be located at the center of the vessel or a position near the center of the vessel. In some embodiments, the starting point may be located at the boundary of the vessel or a position near the boundary of the vessel. The selection of the starting point may be based on image data, vessel data, a result of a vessel identification, or a result of vessel segmentation, etc. For example, a selection of a starting point of an abdominal aorta may be based on an identification result of the abdominal aorta, a vessel mask of the abdominal aorta, or an image of the abdomen, etc. As another example, in order to track endpoint(s) of other vessels in an abdomen, one or more pixels (or voxels) in the identified abdominal aorta may be selected as the starting point. In some embodiments, the starting point may be an automatically identified point. For example, a point with the largest gray value may be selected as the starting point. As another example, a center point of a specific part of the vessel may be selected as the starting point. In some embodiments, the starting point selection sub-unit 810 may be unnecessary.

The vessel endpoint tracking sub-unit 820 may track endpoint(s) of the vessel. The tracking of the endpoint(s) of the vessel may refer to looking for the endpoint(s) of the vessel based on the starting point. In some embodiments, the starting point may be an endpoint of the vessel. In some embodiments, the tracking of the endpoint(s) of the vessel may be performed based on endpoint(s) of the vessel or endpoint(s) of other vessels as the starting point. For example, endpoint(s) of an abdominal aorta may be tracked based on a starting point in the abdominal aorta. As another example, endpoint(s) of arteriole vessels connected with the abdominal aorta may also be tracked based the starting point in the abdominal aorta. As still another example, one endpoint of the abdominal aorta may be set as the starting point to track an endpoint at the other end of the abdominal aorta. In some embodiments, endpoint(s) of a vessel with a smaller diameter may be tracked based on a starting point of a vessel with a larger diameter. In some embodiments, the endpoint(s) of a vessel with a larger diameter may be tracked based on a starting point of a vessel with a smaller diameter. In some embodiments, the vessel endpoint tracking sub-unit 820 may track endpoint(s) of one or more vessels based on one or more starting points. For example, a vessel may include two or more bifurcation vessels, endpoints of the two or more bifurcation vessels may be tracked based on one or more starting points of the vessel.

FIG. 8-B is a flowchart illustrating an exemplary process for selecting endpoints of a vessel according to some embodiments of the present disclosure. The process for selecting endpoints of the vessel may include selecting a starting point 830, tracking the endpoints of the vessel 840, etc.

In step 830, a starting point may be selected. In some embodiments, the selection of the starting point may be based on vessel data, for example, the vessel data detected in step 760, the vessel data obtained from the preprocessing sub-module 410, the data acquisition module 210, the storage module 220, the display module 230, the input/output device 140, and/or the network 170, etc. In some embodiments, the selection of the starting point may be based on some selection rules. The selection rules may be associated with grayscale value, position, etc. For example, a pixels (or a voxel) with a grayscale value larger than a threshold may be selected as the starting point. As another example, a pixel (or a voxel) with a certain distance from the boundary of the vessel may be selected as the starting point. In some embodiments, the selection rules may be compound rules, for example, a starting point satisfied with both a certain grayscale value and a certain position condition. The selection of the starting point may be performed automatically, semi-automatically, or manually. For example, the starting point may be automatically selected based on one or more selecting rules. As another example, a user or an operator may manually select the starting point via a graphical user interface of the input/output device 140. As still another example, based on the automatically selected starting point, the user or the operator may perform a manual correction, an alteration, etc. Step 830 may be implemented by the starting point selection sub-unit 810.

In step 840, endpoint(s) of the vessel may be tracked. In some embodiments, the tracking of the endpoint(s) of the vessel may be based on vessel data and the starting point selected in step 830. In some embodiments, the tracking of the endpoint(s) of the vessel may be based on a calculation of connected domains, and/or a level set algorithm, etc. In some embodiments, two endpoints of the vessel may be tracked along two directions (a first direction of the vessel and a second direction of the vessel) respectively. The first direction of the vessel and/or the second direction of the vessel may be the same as or opposite with the flow direction of the vessel, or with a certain angle with the flow direction of the vessel. In some embodiments, for a vessel with a relatively uniform diameter, two endpoints located at two ends of two extension directions of the vessel may be tracked based on the starting point, by determining the connected domain of the starting point along the two extension directions of the vessel respectively. In some embodiments, the endpoint(s) of the vessel may be found based on the starting point according to a level set algorithm. In some embodiments, for a vessel with bifurcation(s), endpoints of the vessel may be tracked one or more times. For example, endpoint(s) of each bifurcation vessel may be tracked in sequence. As another example, endpoints of two or more bifurcation vessels may be determined in one tracking. In some embodiments, the tracking of two or more endpoints of the vessel may be performed simultaneously, successively, or alternately. Step 840 may be implemented by the vessel endpoint tracking sub-unit 820.

It should be noted that the above description of the vessel endpoint tracking sub-unit and the process for selecting endpoints of a vessel is provided merely for the purpose of illustration, and should not be designated as the only practical embodiment. Each unit above may be implemented via one or more components and the functions of each unit are not limited therein. Each unit above may be added or omitted based on particular application scenarios. Obviously, for persons having ordinary skills in the art, after understanding the general principle of the detection of the characteristic line of the vessel, without departing the principle, may modify or change the forms and details of the particular practical ways and steps of the vessel characteristic line detection sub-module, and further make simple deductions or substitutions, or may make modifications or combinations of the order of the units without further creative efforts. However, those variations and modifications do not depart the scope of the present disclosure. For example, the starting point selection sub-unit 810 and/or step 830 may be unnecessary.

FIG. 9-A is a schematic diagram illustrating an image transformation unit 530 according to some embodiments of the present disclosure. The image transformation unit 530 may include a grayscale image transformation sub-unit 910, a distance field image calculation sub-unit 920, and an image combination sub-unit 930, etc.

The grayscale image transformation sub-unit 910 may perform a grayscale image transformation. The grayscale image transformation may be performed on one or more image data, grayscale values of the image data may be transformed based on a transformation rule. The transformation rule may be a transformation function. In some embodiments, the grayscale image transformation may be based on one or more grayscale transformation functions $G(x)$.

In some embodiments, if the grayscale value of a pixel (or voxel) of the image data is g, after the calculation of the grayscale transformation function $G(x)$, the grayscale value of the pixel (or voxel) may be transformed to $g'=G(g)$. In some embodiments, the grayscale transformation function $G(x)$ may be a piecewise function, a power function, an exponential function, a trigonometric function, a logarithmic function, or the like, or any combination thereof. In some embodiments, the grayscale image transformation sub-unit 910 may perform two-level or multi-level transformations on the image data. For example, assuming that the grayscale image transformations are $G_1(x)$, $G_2(X)$ $G_3(X)$ ... $G_n(x)_7$ wherein n is a positive integer. For the pixel (or voxel) with the grayscale value g, the grayscale value may be $G_1(g)$ after a first level grayscale transformation; the grayscale value may be $G_2(G_1(g))$ after a second level grayscale transformation; in this way, a value may be calculated by n level grayscale transformations. In some embodiments, when performing two-level or multi-level transformations, the grayscale transformation functions used in different levels may be same, partially the same, or different. In some embodiments, the grayscale transformations for one or more pixels (or voxels) of the image data may be performed simultaneously, successively, or alternately.

The distance field image calculation sub-unit 920 may calculate an image of a distance field. In some embodiments, the image of the distance field may include one or more distance values. The distance values may be distances between one or more pixels (or voxels) of the image and a reference. The reference may be one or more pixels (or voxels), lines, and/or planes in the image, and may be referred to as a reference point, a reference line, and/or a reference plane respectively. For example, one or more pixels (or voxels) in the image may be designated as the reference, and distance values between other points in the image and the reference may form a distance field. In some embodiments, a center point of a vessel may be designated as the reference point, a boundary line of the vessel may be designated as the reference line, or an outer wall of the vessel may be designated as the reference plane, etc. In some embodiments, the distance may be a vertical distance, for example, a vertical distance between a pixel (or voxel) in the vessel and the boundary line of the vessel. In some embodiments, the vertical distance may be a vertical distance between a pixel (or voxel) and a tangential direction of the reference line (or the reference plane). In some embodiments, if the reference line (or the reference plane) includes two or more tangential directions, the vertical distance may be the shortest one of the vertical distances between a pixel (or voxel) and the two or more tangential directions of the reference line. In some embodiments, the distance may be a distance between a pixel (or voxel) and a line with an angle θ with a tangential direction of the reference line (or the reference plane). θ may be any value between 0° and 360°. In some embodiments, the distance is the vertical distance when θ equals to 90°. In some embodiments, if the reference line (or the reference plane) includes two or more tangential directions, accordingly, two or more distances corresponding to angle θ may be determined, and then the shortest one may be selected as the distance value of the pixel (or voxel) in the distance field.

In some embodiments, for one or more pixels (or voxels) in the image, a distance value may defined; the distance value(s) of the one or more pixels (or voxels) in the image may form a distance field. In some embodiments, a constant value may be assigned to the distance value(s) of the one or more pixels (or voxels). For example, the distance values of the pixels (or voxels) located at the edge of the vessel may be defined as 0 (or 1, or any other values), the distance values of the pixels (or voxels) located at the center of the vessel may be defined as 0 (or 1, or any other values), etc. In some embodiments, the distance values of the reference point, the reference line, and/or the reference plane may be defined as 0. In some embodiments, the distance value may be further processed. The processing of the distance value may include a normalization processing, calculating a reciprocal, a logarithm transformation, calculating a variation gradient, a centralized transformation, a maximum difference normalization method, or the like, or any combination thereof. An image of the distance field may refer to an image of the distance field represented in a visualization form. In some embodiments, the image of the distance field may refer to an image that may directly represent the distance field. In some embodiments, the image of the distance field may refer to an image obtained after a certain transformation is performed on the distance values of the distance field.

The image combination sub-unit 930 may combine two or more images. The images to be combined may be images before transformations and/or images after transformations. For example, an image before a transformation and a grayscale image after the transformation may be combined. As another example, the image before the transformation and an image of a distance field may be combined. As still another example, the grayscale image after the transformation and the image of the distance field may be combined. The image combination may refer to a combination of data of same pixels (or voxels) in two or more images. During the image combination, multiple combination ways, for example, an addition, a subtraction, a multiplication or a division, or any combination thereof may be used. In some embodiments, a weighted combination during the image combination may be used. For example, a first weight may be assigned to a first image, a second weight may be assigned to a second image, then an addition, a subtraction, a multiplication, a division, or any combination thereof may be performed on data of the two images based on the weights.

FIG. 9-B is a flowchart illustrating an exemplary process for an image transformation according to some embodiments of the present disclosure. The process for the image transformation may include transforming a grayscale image 940, calculating an image of a distance field 950, and an image combination 960.

In step 940, a grayscale image transformation may be performed. The grayscale image transformation may be implemented by the grayscale image transformation sub-unit 910. The grayscale image transformation may be based on the image data obtained in step 740, the result of the vessel segmentation in step 750, or the vessel data detected in step 760. The grayscale image transformation may be based on one or more transformation functions. In some embodiments, the grayscale transformation function $G(x)$ may be a piecewise function, a power function, an exponential function, a trigonometric function, a logarithmic function, or the like, or any combination thereof. In some embodiments, the grayscale transformation function $G(x)$ may be based on a grayscale probability distribution of an image. In some embodiments, the determination of the grayscale probability distribution may be based on one or more thresholds. In some embodiments, the thresholds may be thresholds calculated based on a histogram of the image, for example, the threshold T calculated in step 750. In some embodiments, the grayscale probability distribution may be calculated based on vessel data (including pixels (or voxels) inside a vessel and pixels (or voxels) located at the boundary of the vessel), but pixels (or voxels) outside the vessel may not participate in the calculation of the grayscale probability distribution.

In some embodiments, the grayscale transformation function $G(x)$ may be described as Formula (1):

$$G(x)=kB^{f(x)}+c, \qquad (1)$$

where k, B, and c may represent constants, x may represent the grayscale value of a current pixel in the image, and $f(x)$ may represent an intermediate function. k, B, and/or c may be values preset by the system, values preset by a user, and/or values obtained by calculating the image data, or values inputted via the input/output device 140. For example, k may be set as 1; c may be set as 0; and, B may be set as a natural constant e.

In some embodiments, $G(x)$ may be a piecewise function described as Formula (2):

$$G(x) = \begin{cases} k_1 B^{f(x)} + c_1, & x \geq I_0 \\ k_2 B^{f(x)} + c_2, & x < I_0 \end{cases}, \qquad (2)$$

where, $k_1$, $c_1$, $k_2$, and $c_2$ may represent constants, and $I_0$ may represent a reference grayscale value. $k_1$, $c_1$, $k_2$, $c_2$ and/or $I_0$ may be values preset by the system, values set by a user, and/or values obtained by calculating the image data, or values inputted via the input/output device 140. For example, $k_1$ and $k_2$ may be set as 1; $c_1$ and $c_2$ may be set as 0; and B may be set as a natural constant e. In some embodiments, the reference grayscale value $I_0$ may refer to a grayscale reference standard. The reference grayscale value $I_0$ may be obtained based on the grayscale probability distribution of the image. In some embodiments, $I_0$ may be calculated based on Formula (3):

$$I_0=rI_{min}+d(I_{max}-I_{min}), \qquad (3)$$

where r, d, $I_{min}$, and $I_{max}$ may represent constants. r, d, $I_{min}$, and/or $I_{max}$ may be values preset by the system, values set by a user, and/or values obtained by calculating the image data, or values inputted via the input/output device 140. For example, $I_{min}$ may represent the minimum grayscale value of the image data; $I_{max}$ may represent the maximum grayscale value of the image data. In some embodiments, r may be set as 1; and, d may be set as ⅕.

In some embodiments, the intermediate function $f(x)$ may be a piecewise function described as Formula (4):

$$f(x) = \begin{cases} -(x-I_0)/w_1, & x \geq I_0 \\ (x-I_0)/w_2, & x < I_0 \end{cases}, \quad (4)$$

where $w_1$ and $w_2$ may represent constants. In some embodiments, $w_1$ and $w_2$ may represent control parameters of a grayscale range. The higher the values of $w_1$ and $w_2$ are, the smaller the absolute value of the intermediate function $f(x)$ may be accordingly. $w_1$ and/or $w_2$ may be values preset by the system, values preset a user, and/or values obtained by calculating the image data, or values inputted via the input/output device 140. For example, $w_1$ and/or $w_2$ may be obtained based on the grayscale probability distribution of the image. In some embodiments, $w_1$ and/or $w_2$ may be described as Formula (5) and Formula (6), respectively:

$$w_1 = m(I_{max} - I_0) + p, \quad (5)$$

$$w_2 = m(I_0 - I_{min}) + q, \quad (6)$$

where m, n, p and q may represent constants. m, n, p and/or q may values preset by the system, values preset by a user, and/or values obtained by calculating the image data, or values inputted via the input/output device 140. For example, m may be set as ¼; n may be set as ½; and, p and q may be set as 0. According to Formula (4), (5) and (6), $w_1$ and $w_2$ may be used to adjust or control regions needed to be transformed. For example, in a region between $w_1$ and $w_2$, a grayscale value difference among two or more pixels (or voxels) may be increased; in a region outside $w_1$ and $w_2$, a grayscale value difference among two or more pixels (or voxels) may be decreased. In some embodiments, a difference between grayscale values of a vessel (boundary and inside) and grayscale values of regions around the vessel may be increased based on a process according to Formulas (4), (5) and (6).

An expression of the grayscale transformation function $G(x)$ may be determined based on Formula (2) and (4). In some embodiments, $G(x)$ may be described as Formula (7):

$$G(x) = \begin{cases} \exp(-(x-x_0)/w_1)/2, & x \geq I_0 \\ 1 - \exp((x-x_0)/w_2)/2, & x < I_0 \end{cases}, \quad (7)$$

In some embodiments, after the grayscale image transformation, around the reference grayscale value, the distinguish degree of the grayscale may be enhanced. The higher the grayscale values of the pixels (or voxels) of the vessel are, the smaller the transformed grayscale values may be; while the smaller the grayscale values of the pixels (or voxels) of the vessel are, the higher the transformed grayscale values may be. In some embodiments, the transformed grayscale values of the pixels (or voxels) of the center part of the vessel may be smaller than the transformed grayscale values of pixels (or voxels) of the edge part of the vessel; the centerline of the vessel may pass through parts with the smaller transformed grayscale values.

In step 950, an image of the distance field may be determined. The determination of the image of the distance field may be implemented by the distance field image calculation sub-unit 920. The determination of the image of the distance field may be based on the image data obtained in step 740, the result of the vessel segmentation in step 750, the vessel data detected in step 760, or the result of the grayscale image transformation in step 940. The determination of the image of the distance field may be based on distance value d. In some embodiments, the determination of the image of the distance field may be based on the result of the coarse segmentation of the vessel, for example, the distance field may be calculated based on a vessel mask. In some embodiments, in order to improve the processing speed, in step 950, only the distance field of the vessel data may be calculated, and the distance field of non-vessel data may be omitted, for example, only the distance field of the pixels (or voxels) inside the vessel may be calculated, and the distance field of the pixels (or voxels) outside the vessel may not be calculated.

In some embodiments, the distance values d of pixels (or voxels) may be directly defined based on a certain initial value. In some embodiments, the distance values d of the pixels (or voxels) may be calculated based on a certain calculation rule. For example, the distance values d of the pixels (or voxels) located at the boundary of the vessel may be defined as 0, and the distance value d of one of other pixels (or voxels) inside the vessel may be calculated based on the vertical distance between the pixel (or voxel) and the boundary of the vessel. In some embodiments, a vessel may include a left boundary and a right boundary, a vertical distance between a certain pixel (or voxel) and the left boundary of the vessel and a vertical distance between a certain pixel (or voxel) and the right boundary of the vessel may be calculated simultaneously, the smallest distance may be determined as the distance value d of the certain pixel (or voxel).

In some embodiments, the determination of the image of the distance field may be based on one or more distance value transformation functions D(d). In some embodiments, the distance value transformation function D(d) may be a piecewise function, a power function, an exponential function, a trigonometric function, a logarithmic function, or the like, or any combination thereof. The distance value transformation functions D(d) may be described as Formula (8):

$$D(d) = aA^{f_1(d)} + b, \quad (8)$$

where a, b and A may represent constants, and $f_1(d)$ may represent an intermediate function. a, b, and/or A may be values preset by the system, values obtained by calculating the image data, or values inputted via the input/output device 140. For example, a may be set as 1, and, b may be set as 0. As another example, A may be set as a natural constant e.

In some embodiments, $f_1(d)$ may be further described as Formula (9):

$$f_1(d) = hd + l, \quad (9)$$

where h and l may represent constants. h and l may be values preset by the system, values obtained by calculating the image data, or values inputted via the input/output device 140. For example, h may be set as −1, and, l may be set as 0.

The expression of the distance value transformation function D(d) may be determined based on Formula (8) and (9). In some embodiments, D(d) may be described as Formula (10):

$$D(d) = 1/\exp(d), \quad (10)$$

In some embodiments, when pixels (or voxels) are located at the boundary of the vessel, the distance value transformation function D(d) may be 1, while as close to the center of the vessel, the value of D(d) may decrease gradually.

In step 960, an image combination may be performed. The image combination may be implemented by the image combination sub-unit 930. The image combination may be based on the image data obtained in step 740, the result of the vessel segmentation in step 750, the vessel data detected in step 760, the result of the grayscale image transformation in step 940, and/or the image of the distance field determined in step 950. In some embodiments, a weighted combination may be performed based on two or more images, for example, an image may be represented as a data matrix Image1, the other image may be represented as a data matrix Image2. The weighted combination of the images may be described as Formula (11):

$$\text{IMAGE} = F(W1 \cdot \text{Image1}, W2 \cdot \text{Image2}), \quad (11)$$

where IMAGE may represent a data matrix after the image combination, F may represent an image combination function, W1 may represent a weight of Image1, and W2 may represent a weight of Image2. W1 and/or W2 may be constants, for example, positive constants, negative constants, or zero. The function F may be addition, subtraction, multiplication, division, reciprocal, a piecewise function, a power function, an exponential function, a trigonometric function, a logarithmic function, or the like, or any combination thereof.

In some embodiments, a weighted sum combination may be performed as described in Formula (12):

$$\text{IMAGE} = W1 \cdot \text{Image1} + W2 \cdot \text{Image2}, \quad (12)$$

In some embodiments, the result of the grayscale image transformation in step 940 may be designated as the data matrix Image1, the weighted combination of the images of the distance field calculated in step 950 may be the data matrix Image2. In some embodiments, for pixels (or voxels) near the center part of the vessel, and pixels (or voxels) with relatively higher image grayscale values, the values after the image combination may be relatively smaller; the centerline of the vessel may pass through parts with a smaller value.

It should be noted that the above description of the vessel endpoint tracking sub-unit and the process for selecting endpoints of a vessel is provided merely for the purpose of illustration, and should not be designated as the only practical embodiment. Each unit above may be implemented via one or more components and the functions of each unit are not limited therein. Each unit above may be added or omitted based on particular application scenarios. Obviously, for persons having ordinary skills in the art, after understanding the general principle of the image transformation, without departing the principle, may modify or change the forms and details of the particular practical ways and steps of the vessel characteristic line detection sub-module, and further make simple deductions or substitutions, or may make modifications or combinations of the order of the units without further creative efforts. However, those variations and modifications do not depart the scope of the present disclosure. In some embodiments, the image combination sub-unit 930 and/or the image combination step 960 may be unnecessary. In some embodiments, step 940 or step 950 may be unnecessary. In some embodiments, the grayscale image transformation sub-unit 910 and/or the distance field image calculation sub-unit 920 may be replaced with other sub-units. In some embodiments, step 940 and/or step 950 may be replaced with other processing steps. In some embodiments, step 940, step 950, and step 960 may be combined into an independent step, for example, a weighted combination may be performed on the grayscale transformation function G(x) and the distance value transformation function D(d) to obtain a compound function, the image data may be then transformed based on the compound function.

FIG. 10-A is a schematic diagram illustrating a vessel centerline determination unit 540 according to some embodiments of the present disclosure. The vessel centerline determination unit 540 may include a level set function field calculation sub-unit 1010, a crosspoint acquisition sub-unit 1020, and a path point determination sub-unit 1030.

The level set function field calculation sub-unit 1010 may calculate a level set function field. During a curve evolution of an initial curve based on a certain evolution rule, level set functions may update constantly, an evolution curve corresponding to a zero level set of the level set functions may be referred to as the level set function. The initial curve of the level set function field may be set based on one or more pixels (or voxels). In some embodiments, the initial curve of the level set function field may be one or more endpoints of a vessel tracked by the vessel endpoint tracking sub-unit 820. In some embodiments, the initial curve of the level set function field may be a curve connecting two or more endpoints of a vessel. In some embodiments, the level set function field may correspond to one or more centerlines of vessels.

The crosspoint acquisition sub-unit 1020 may select crosspoint(s) of two or more level set function fields. The crosspoint(s) of the two or more level set function fields may refer to crosspoint(s) of corresponding two or more evolution curves. The crosspoint(s) of the two or more level set function fields may be one or more pixels (or voxels).

The path point determination sub-unit 1030 may determine path point(s) of a centerline of a vessel. The path point(s) may be one or more local extremum points. The local extremum point may refer to a pixel (or voxel) with a maximum value or a minimum value in a certain neighborhood. In some embodiments, image data used to determine the local extremum points may be data obtained from the vessel data acquisition unit 510, the data acquisition module 210, the storage module 220, or the input/output device 140, or data obtained from external data sources via the network 170. In some embodiments, the image data used to determine the local extremum points may be data obtained in step 310, data obtained in step 440 preprocessing, the vessel data obtained in step 610, the image data obtained in step 740, the vessel data segmented in step 750, or the vessel data identified in step 760, etc. In some embodiments, the image data used to determine the local extremum points may be the transformed grayscale image data in step 940, the data of the image of the distance field calculated in step 950, or the data after the image combination in step 960, etc. The determination of the local extremum points may be based on one or more calculation directions, for example, under rectangular coordinate system, the calculation may be performed based on x axis direction and/or y axis direction. As another example, under three-dimensional reference system, the calculation may be performed based on x axis direction, y axis direction, and/or z axis direction. In some embodiments, the determination of the path point(s) may be based on one or more algorithms, for example, local minimum points may be determined by a gradient descent algorithm, a search algorithm based on a maximum gradient algorithm, etc., then the pixels (or voxels) corresponding to the local minimum points may be determined as the path points.

FIG. 10-B a flowchart illustrating an exemplary process for determining a path of a centerline of a vessel according to some embodiments of the present disclosure. The process for determining the path of the centerline of the vessel may include determining level set function fields 1040, selecting crosspoint(s) 1050, and determining path point(s) 1060.

In step 1040, level set function fields may be determined. The determination of the level set function fields may be based on endpoints of a vessel, for example, the endpoints of the vessel obtained in step 620 or step 840. The endpoints of the vessel may be set as an initial curve to perform evolutions to determine the level set function fields. The level set function fields may be determined based on image data (e.g., the image data obtained in step 740) or a result of an image transformation (e.g., the transformed image data in step 940, 950, or 960). In some embodiments, the determination of the level set function fields may be based on a weighted result of a grayscale value transformation and a distance field transformation. In some embodiments, a level set function may be represented by a time-dependent partial differential equation, and the evolution equation of the level set function may be described as Formula (13):

$$\begin{cases} \dfrac{\partial \phi}{\partial t} + E|\nabla_\phi| = 0 \\ \phi(x, t = 0) = \phi_0(x) \end{cases} \quad (13)$$

where $|\nabla \phi|$ may represent a normal direction, $\phi_0(x)$ may represent an outline of an initial curve, and E may represent a balance between an inward force and an outward force. The inward force may be a force based on an internal geometrical shape (e.g., a mean curvature, an outline length, and/or an area, etc.). The outward force may be a force based on an image gradient. In some embodiments, two endpoints of a certain vessel may be respectively set as the initial curve to perform the determination of the level set function fields. In some embodiments, the determinations of two or more level set function fields may be performed simultaneously, successively, or alternately. Step 1040 may be implemented by the level set function field calculation sub-unit 1010.

In step 1050, crosspoint(s) may be obtained. The crosspoint(s) may be crosspoint(s) of two or more curves. The crosspoint(s) may be one or more crosspoints. The crosspoint(s) may be crosspoint(s) of two or more level set function fields. The crosspoint(s) of level set function fields may refer to crosspoint(s) of evolution curves corresponding to the level set function fields. In some embodiments, the selection of the crosspoint(s) may be based on the two or more level set function fields determined in step 1040. For example, in step 1040, two endpoints of the vessel may be selected as the initial curves to determine the level set function fields respectively, when the two level set function fields include a crosspoint, the determination of the level set function fields may end, then the crosspoint of the two level set function fields may be obtained in step 1050. Step 1050 may be implemented by the crosspoint acquisition sub-unit 1020.

In step 1060, path point(s) may be determined. The determination of the path point(s) may be based on the crosspoint(s) selected in step 1050. For example, a region between vessel parts in which two or more crosspoints are located may be determined as a region needed to determine the path point(s). The determination of the path point(s) may be based on one or more determination directions. For example, for a two-dimensional image, a pixel in the image may have 8 neighboring pixels, each neighboring pixel may represent a determination direction. As another example, for a three-dimensional image, a pixel in the image may have 26 neighboring pixels, each neighboring pixel may represent a determination direction. In some embodiments, if a pixel (or voxel) is an extremum point determined in a direction, the pixel (or voxel) may be determined as the path point. In some embodiments, if a pixel (or voxel) is an extremum point determined both in two or more directions, the point may be determined as the path point. The determination of the path point(s) may be based on one or more algorithms, for example, a gradient descent algorithm. In some embodiments, the path point(s) determined in step 1060 may be set as pixels (or voxels) of a centerline of a vessel. Step 1060 may be implemented by the path point determination sub-unit 1030.

It should be noted that the above description of the vessel endpoint tracking sub-unit and the process for selecting endpoints of a vessel is provided merely for the purpose of illustration, and should not be designated as the only practical embodiment. Each unit above may be implemented via one or more components and the functions of each unit are not limited therein. Each unit above may be added or omitted based on particular application scenarios. Obviously, for persons having ordinary skills in the art, after understanding the general principle of the determination of the path of the vessel, without departing the principle, may modify or change the forms and details of the particular practical ways and steps of the vessel characteristic line detection sub-module, and further make simple deductions or substitutions, or may make modifications or combinations of the order of the units without further creative efforts. However, those variations and modifications do not depart the scope of the present disclosure. For example, a step in which the centerline of the vessel may be visualized may be added after step 1060 in which the path point(s) may be determined, the centerline of the vessel may be formed by connecting the endpoints of the vessel, the crosspoint(s) selected in step 1050, and the path point(s) determined in step 1060. In some embodiments, step 1050 and/or step 1060 may be unnecessary, while in step 1040, the path of the centerline of the vessel may be directly determined by determining the level set function fields.

EXAMPLES

The following examples are provided for the purpose of illustration, and are not intended to limit the scope of the present disclosure.

FIG. 11-A and FIG. 11-B illustrate two exemplary images of identification results of vessels according to some embodiments of the present disclosure. FIG. 11-A is an MRI of a vessel mask of head and neck. Based on the symmetry of the left internal carotid artery and right internal carotid artery and the symmetry of left vertebral artery and right vertebral artery, connected domains of the vessel in the image of the vessel mask were determined, four vessels with the largest connected domains were selected and recognized as left common carotid—internal carotid artery, right common carotid—internal carotid artery, left vertebral artery, and right vertebral artery. A starting point of one of the vessels was selected, for example, a pixel marked as "S", from the starting point "S", a tracking for vessel was performed upward and downward respectively, and two endpoints of the vessel were obtained.

FIG. 11-B is another MRI of a vessel mask of head and neck. Similar to FIG. 11-A, based on the symmetry of the left internal carotid artery and right internal carotid artery and the symmetry of left vertebral artery and right vertebral artery, connected domains of the vessel in the image of the vessel mask were determined, four vessels with the largest connected domains were selected and recognized as left internal carotid artery, right internal carotid artery, left vertebral artery, and right vertebral artery. A starting point of one of the vessels was selected, for example, a pixel marked as "S", from the starting point "S", a tracking for vessel was performed upward and downward respectively, and two endpoints ("E1" and "E2") of the vessel were obtained.

FIG. 12-A through FIG. 12-C illustrate three exemplary images of results of centerlines of vessels detected based on different methods according to some embodiments of the present disclosure. FIG. 12-A through FIG. 12-C are MRI images of vessels from different parts of a human body. As shown in FIG. 12-A, the region with relatively brighter brightness is a vessel, and the brightness inside the vessel is not evenly distributed. For example, although the region indicated by the arrow is inside the vessel, the brightness is relatively darker, and has a difference with the brightness of the surrounding vessels. When the detection of the centerline of the vessel was performed, an image transformation operation based on grayscale was performed on the image in FIG. 12-A, and the transformation function is described as Formula (7). Then pixels inside the vessel with smaller transformation values were selected and determined as a path of the centerline of the vessel, the centerline of the vessel 1210 was obtained. It could be seen that, the centerline of the vessel 1210 passes through the brighter regions in the image, at the position indicated by the arrow, the centerline of the vessel 1210 still passes through the brighter regions. After the image transformation operation based on the grayscale, the trend of the centerline of the vessel could be adjusted by setting a reference grayscale value, the centerline of the vessel could be conveniently detected based on the feature of the grayscale.

As shown in FIG. 12-B, the vessel is bent. When the detection of the centerline of the vessel was performed, FIG. 12-B performed an image transformation operation based on a distance field, and the transformation function is illustrated in Formula (10). Pixels with smaller function values of the distance field were selected and determined as a path of the centerline of the vessel, then the centerline of the vessel 1220 was obtained. It could be seen that, the centerline of the vessel 1220 extends along the bending direction at the bending position (as indicated by the arrows). After the image transformation operation based on the distance field, the trend of the centerline of the vessel could be adjusted by changing the transformation function of distance values, then the centerline of the vessel could be conveniently detected based on the feature of spatial distances.

As shown in FIG. 12-C, the brightness inside the vessel is not evenly distributed, and the vessel is bent, as indicated by the arrows. When the detection of the centerline of the vessel was performed, FIG. 12-C performed an image transformation operation based on grayscale, the transformation function is illustrated as Formula (7); simultaneously, FIG. 12-C also performed an image transformation operation based on a distance field, the transformation function is illustrated as Formula (10); then the transformed images obtained by the two transformation operations were weighted combined. Pixels with smaller transformation function values were determined as a path of the centerline of the vessel, and then the centerline of the vessel 1230 was obtained. It could be seen that, although in the exemplary image FIG. 12-A the brightness inside the vessel is not evenly distributed and in FIG. 12-B the vessel is bent in several places, with a weighted combination of the grayscale transformation and the distance filed transformation, the centerline of the vessel 1230 passed through the center region of the vessel at the bending parts (as indicated by the arrows); also passed through the center region of the vessel at the parts where the brightness is uneven.

Thus, the combination of the image transformation based on the grayscale and the image transformation based on the distance field may efficiently improve the detection effect of the centerline of the vessel. In one aspect, it may make the centerline of the vessel follow the bending vessel, and do not pass through the boundary of the vessel. In another aspect, it may make the centerline of the vessel do not avoid the darker regions of the vessel, and make the centerline of the vessel locate at the center regions of the vessel.

Various aspects of the method for detecting a centerline of a vessel and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH- EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure

We claim:

1. A method for detecting a centerline of a vessel, comprising:
   obtaining image data, wherein the image data includes vessel data;
   selecting two endpoints of the vessel including a first endpoint and a second endpoint based on the vessel data;
   performing a grayscale transformation on a plurality of pixels of the image data to generate a first transformed image based on a grayscale transformation function;
   performing a distance field transformation on the plurality of pixels of the image data to generate a second transformed image based on a distance field calculation function;
   performing a weighted combination on the first transformed image and the second transformed image to generate a transformed image by summing weighted data of each same pixel in the first transformed image and the second transformed image; and
   determining a path of the centerline of the vessel connecting the first endpoint and the second endpoint to obtain the centerline of the vessel based on the transformed image.

2. The method of claim 1, the image data further comprising data of a vessel mask.

3. The method of claim 2, further comprising:
   identifying the vessel data based on the data of the vessel mask.

4. The method of claim 3, the identifying the vessel data comprising:
   determining a plurality of connected domains of the data of the vessel mask;
   dividing a symmetrical region based on a symmetry among the plurality of connected domains; and
   determining vessel data with largest connected domain in the symmetrical region.

5. The method of claim 3, the identifying the vessel data comprising:
   determining sizes of candidate vessels based on the data of the vessel mask; and
   identifying the candidate vessel with largest size among the candidate vessels.

6. The method of claim 2, further comprising:
   performing vessel segmentation to obtain the data of the vessel mask based on the image data.

7. The method of claim 6, the performing the vessel segmentation comprising:
   determining an image feature based on the image data;
   selecting at least one threshold based on the image feature; and
   selecting the data of the vessel mask from the image data based on the at least one threshold.

8. The method of claim 7, the image feature comprising a feature of a histogram.

9. The method of claim 7, the performing the vessel segmentation further comprising:
   performing a dilation on an image corresponding to the data of the vessel mask based on the selected data of the vessel mask.

10. The method of claim 1, the selecting the two endpoints of the vessel comprising:
    selecting a starting point based on the vessel data.

11. The method of claim 10, the selecting the two endpoints of the vessel further comprising:
    tracking the vessel in a first direction of the vessel to obtain the first endpoint based on the starting point.

12. The method of claim 11, the selecting the two endpoints of the vessel further comprising:
    tracking the vessel in a second direction of the vessel to obtain the second endpoint based on the starting point.

13. The method of claim 10, the selecting the two endpoints of the vessel further comprising:
    searching for the first endpoint using a level set algorithm based on the starting point.

14. The method of claim 13, the selecting the two endpoints of the vessel further comprising:
    searching for the second endpoint using the level set algorithm based on the starting point.

15. The method of claim 1, the determining the path of the centerline of the vessel connecting the first endpoint and the second endpoint comprising:
    determining a first level set function field of the first endpoint based on the transformed image;
    determining a second level set function field of the second endpoint based on the transformed image;
    determining a crosspoint of the first level set function field of the first endpoint and the second level set function field of the second endpoint; and
    performing a calculation, based on the crosspoint, according to the transformed image using a gradient descent algorithm to identify a point of the path of the centerline of the vessel.

16. The method of claim 2, the performing a distance field transformation on the plurality of pixels of the image data to generate a second transformed image based on a distance field calculation function comprising:
    performing the distance field transformation on the data of the vessel mask to generate the second transformed image based on the distance field calculation function.

17. The method of claim 1, wherein the grayscale transformation function is based on an eigenvalue of a grayscale probability distribution of the image data.

18. A non-transitory computer readable medium including executable instructions that, when executed by at least one processor, cause the at least one processor to effectuate a method comprising:

obtaining image data, wherein the image data includes vessel data;

selecting two endpoints of a vessel including a first endpoint and a second endpoint based on the image data;

performing a grayscale transformation on a plurality of pixels of the image data to generate a first transformed image based on a grayscale transformation function;

performing a distance field transformation on the plurality of pixels of the image data to generate a second transformed image based on a distance field calculation function;

performing a weighted combination on the first transformed image and the second transformed image to generate a transformed image by summing weighted data of each same pixel in the first transformed image and the second transformed image; and determining a path of a centerline of the vessel connecting the first endpoint and the second endpoint to obtain the centerline of the vessel based on the transformed image.

19. A system for detecting a centerline of a vessel, the system comprising:

at least one processor; and executable instructions that, when executed by the at least one processor, cause the at least one processor to effectuate a method comprising:

obtaining image data, wherein the image data includes vessel data;

selecting two endpoints of the vessel including a first endpoint and a second endpoint based on the image data;

performing a grayscale transformation on a plurality of pixels of the image data to generate a first transformed image based on a grayscale transformation function;

performing a distance field transformation on the plurality of pixels of the image data to generate a second transformed image based on a distance field calculation function;

performing a weighted combination on the first transformed image and the second transformed image to generate a transformed image by summing weighted data of each same pixel in the first transformed image and the second transformed image; and determining a path of the centerline of the vessel connecting the first endpoint and the second endpoint to obtain the vessel centerline based on the transformed image.

* * * * *